United States Patent
Singh et al.

(10) Patent No.: US 12,484,046 B2
(45) Date of Patent: Nov. 25, 2025

(54) PRE-CONFIGURED ALLOCATION FOR NON-PERIODIC TRAFFIC PATTERN

(71) Applicant: Telefonaktiebolaget LM Ericsson (publ), Stockholm (SE)

(72) Inventors: Bikramjit Singh, Raasepori (FI); Massimo Condoluci, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 18/261,307

(22) PCT Filed: Mar. 18, 2021

(86) PCT No.: PCT/SE2021/050239
§ 371 (c)(1),
(2) Date: Jul. 13, 2023

(87) PCT Pub. No.: WO2022/197224
PCT Pub. Date: Sep. 22, 2022

(65) Prior Publication Data
US 2024/0073886 A1    Feb. 29, 2024

(51) Int. Cl.
H04W 72/1263    (2023.01)
H04W 72/23    (2023.01)

(52) U.S. Cl.
CPC ....... H04W 72/1263 (2013.01); H04W 72/23 (2023.01)

(58) Field of Classification Search
CPC .......................... H04W 72/1263; H04W 72/23
(Continued)

(56) References Cited

U.S. PATENT DOCUMENTS 11,621,815 B1 *  4/2023  Xu .................. H04L 5/0048
                                                    370/329
11,751,208 B2 *  9/2023  Rastegardoost ...... H04L 1/08
                                                    370/329
(Continued)

FOREIGN PATENT DOCUMENTS

EP    3735061 A1 * 11/2020 ........... H04L 5/0012
EP    3881469 B1 *  9/2024 ........... H04W 72/23
(Continued)

OTHER PUBLICATIONS

"3GPP TS 38.213 V15.12.0", 3rd Generation Partnership Project; Technical Specification Group Radio Access Network; NR; Physical layer procedures for control (Release 15), Dec. 2020, pp. 1-74.
(Continued)

Primary Examiner — Mahendra R Patel
(74) Attorney, Agent, or Firm — Murphy, Bilak & Homiller, PLLC

(57) ABSTRACT

Embodiments include methods for a user equipment (UE) operating in a radio access network (RAN). Such methods include receiving a resource allocation to transmit or receive data in the RAN. The resource allocation includes resources during a plurality of occasions. Such methods include subsequently receiving one or more indications of whether the UE is allowed to transmit or receive during the occasions. Each particular indication is associated with a consecutive subset of the occasions subsequent to the particular indication. Other embodiments include complementary methods for a RAN node, as well as UEs and RAN nodes configured to perform such methods.

16 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,910,409 | B2* | 2/2024 | Hwang | H04W 92/18 |
| 11,968,148 | B2* | 4/2024 | Lee | H04W 72/30 |
| 12,114,325 | B2* | 10/2024 | Oviedo | H04W 74/0808 |
| 2019/0191416 | A1* | 6/2019 | Xie | H04W 72/04 |
| 2019/0254059 | A1* | 8/2019 | Gulati | H04W 72/542 |
| 2020/0359409 | A1* | 11/2020 | Karaki | H04W 72/0446 |
| 2021/0195629 | A1* | 6/2021 | Chauvin | H04L 1/0009 |
| 2022/0183061 | A1* | 6/2022 | Wang | H04L 5/0044 |
| 2023/0058614 | A1* | 2/2023 | Elazzouni | H04W 72/23 |
| 2023/0078444 | A1* | 3/2023 | Maleki | H04W 52/0229 370/311 |
| 2023/0254844 | A1* | 8/2023 | Lee | H04L 5/1469 370/329 |
| 2023/0379119 | A1* | 11/2023 | Dai | G01S 5/0205 |
| 2024/0147430 | A1* | 5/2024 | Elshafie | H04L 5/0053 |
| 2024/0348383 | A1* | 10/2024 | Shariatmadari | H04L 5/0001 |

FOREIGN PATENT DOCUMENTS

| | | | | |
|---|---|---|---|---|
| WO | WO-2020172764 | A1 * | 9/2020 | H04W 72/121 |
| WO | WO-2022015485 | A1 * | 1/2022 | H04L 5/0044 |
| WO | WO-2022084525 | A1 * | 4/2022 | H04W 72/23 |
| WO | WO-2022194444 | A1 * | 9/2022 | |
| WO | WO-2022197223 | A1 * | 9/2022 | H04W 72/23 |
| WO | WO-2023135576 | A1 * | 7/2023 | H04W 74/0833 |
| WO | WO-2023192750 | A1 * | 10/2023 | H04L 5/0044 |

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.

"Enhancement of Configured Grant for NR URLLC", 3GPP TSG RAN WG1 Meeting #96, R1-1901598, Athens, Greece, Feb. 25-Mar. 1, 2019, pp. 1-13.

"3GPP TS 38.321 V16.3.0", 3rd Generation Partnership Project; Technical Specification Group Radio Access Network; NR; Medium Access Control (MAC) protocol specification (Release 16), Dec. 2020, pp. 1-156.

"3GPP TS 38.211 V16.4.0", 3rd Generation Partnership Project; Technical Specification Group Radio Access Network; NR; Physical channels and modulation (Release 16), Dec. 2020, pp. 1-43.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

* cited by examiner

```
ConfiguredGrantConfig ::=      SEQUENCE {
    frequencyHopping                ENUMERATED {intraSlot, interSlot}          OPTIONAL,   -- Need S,
    cg-DMRS-Configuration           DMRS-UplinkConfig,
    mcs-Table                       ENUMERATED {qam256, qam64LowSE}            OPTIONAL,   -- Need S
    mcs-TableTransformPrecoder      ENUMERATED {qam256, qam64LowSE}            OPTIONAL,   -- Need S
    uci-OnPUSCH                     SetupRelease { CG-UCI-OnPUSCH }            OPTIONAL,   -- Need M
    resourceAllocation              ENUMERATED { resourceAllocationType0, resourceAllocationType1, dynamicSwitch },
    rbg-Size                        ENUMERATED {config2}                       OPTIONAL,   -- Need S
    powerControlLoopToUse           ENUMERATED {n0, n1},
    p0-PUSCH-Alpha                  P0-PUSCH-AlphaSetId,
    transformPrecoder               ENUMERATED {enabled, disabled}             OPTIONAL,   -- Need S
    nrofHARQ-Processes              INTEGER(1..16),
    repK                            ENUMERATED {n1, n2, n4, n8},
    repK-RV                         ENUMERATED {s1-0231, s2-0303, s3-0000}     OPTIONAL,   -- Need R
    periodicity                     ENUMERATED {
                                        sym2, sym7, sym1x14, sym2x14, sym4x14, sym5x14, sym8x14, sym10x14, sym16x14,
                                        sym20x14, sym32x14, sym40x14, sym64x14, sym80x14, sym128x14, sym160x14, sym256x14,
                                        sym320x14, sym512x14, sym640x14, sym1024x14, sym1280x14, sym2560x14, sym5120x14, sym6,
                                        sym1x12, sym2x12, sym4x12, sym5x12, sym8x12, sym10x12, sym16x12, sym20x12, sym32x12,
                                        sym40x12, sym64x12, sym80x12, sym128x12, sym160x12, sym256x12, sym320x12, sym512x12,
                                        sym640x12, sym1280x12, sym2560x12 }
},
configuredGrantTimer                INTEGER (1..64)                            OPTIONAL,   -- Need R
rrc-ConfiguredUplinkGrant           SEQUENCE {
    timeDomainOffset                    INTEGER (0..5119),
    timeDomainAllocation                INTEGER (0..15),
    frequencyDomainAllocation           BIT STRING (SIZE(18)),
    antennaPort                         INTEGER (0..31),
    dmrs-SeqInitialization              INTEGER (0..1),
    precodingAndNumberOfLayers          INTEGER (0..63),
    srs-ResourceIndicator               INTEGER (0..15),
    mcsAndTBS                           INTEGER (0..31),
    frequencyHoppingOffset              INTEGER (1.. maxNrofPhysicalResourceBlocks-1)  OPTIONAL,   -- Need R
    pathlossReferenceIndex              INTEGER (0..maxNrofPUSCH-PathlossReferenceRSs-1),
    ...
}                                                                              OPTIONAL,   -- Need R
}
```

FIG. 7A

```
[[
    cg-RetransmissionTimer-r16                INTEGER (1..64)                OPTIONAL,    -- Need R
    cg-minDFI-Delay-r16                       INTEGER (1..ffsValue)          OPTIONAL,    -- Need R Upper limit 7 FFS
    cg-nrofPUSCH-InSlot-r16                   INTEGER (1..ffsValue)          OPTIONAL,    -- Need R
    cg-nrofSlots-r16                          INTEGER (1..ffsValue)          OPTIONAL,    -- Need R
    cg-StartingFullBW-InsideCOT-r16           ENUMERATED {ffs}               OPTIONAL,    -- Need R
    cg-StartingFullBW-OutsideCOT-r16          ENUMERATED {ffs}               OPTIONAL,    -- Need R
    cg-StartingPartialBW-InsideCOT-r16        ENUMERATED {ffs}               OPTIONAL,    -- Need R
    cg-StartingPartialBW-OutsideCOT-r16       ENUMERATED {ffs}               OPTIONAL,    -- Need R
    cg-UCI-Multiplexing                       ENUMERATED {enabled}           OPTIONAL,    -- Need R
    cg-COT-SharingOffset-r16                  INTEGER (1..ffsValue)          OPTIONAL,    -- Need R
    betaOffsetCG-UCI-r16                      INTEGER (1..ffsValue)          OPTIONAL,    -- Need R
    cg-COT-SharingList-r16                    SEQUENCE (SIZE (1..ffsValue)) OF CG-COT-Sharing-r16  OPTIONAL,  -- Need R
    harq-ProcID-Offset-r16                    INTEGER (0..15)                OPTIONAL,    -- Need M
    harq-ProcID-Offset2-r16                   INTEGER (0..15)                OPTIONAL,    -- Need M
    configuredGrantConfigIndex-r16            ConfiguredGrantConfigIndex-r16 OPTIONAL,    -- Need M
    configuredGrantConfigIndexMAC-r16         ConfiguredGrantConfigIndexMAC-r16 OPTIONAL, -- Need M
    periodicityExt-r16                        INTEGER (1..5120)              OPTIONAL,    -- Need M
    startingFromRV0-r16                       ENUMERATED {on, off}           OPTIONAL,    -- Need M
    phy-PriorityIndex-r16                     ENUMERATED {p0, p1}            OPTIONAL,    -- Need M
    autonomousReTx-r16                        ENUMERATED {enabled}           OPTIONAL     -- Cond LCH-BasedPrioritization
]]
}
```

FIG. 7B

PRE-CONFIGURED ALLOCATION FOR NON-PERIODIC TRAFFIC PATTERN

TECHNICAL FIELD

The present invention generally relates to wireless communication networks, and more specifically to techniques for reducing communication latency or delay for applications whose data transmission and/or reception patterns are irregular and/or non-periodic.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR was initially specified in 3GPP Release 15 (Rel-15) and continues to evolve through subsequent releases, such as Rel-16 and Rel-17.

5G/NR technology shares many similarities with fourth-generation Long-Term Evolution (LTE). For example, NR uses CP-OFDM (Cyclic Prefix Orthogonal Frequency Division Multiplexing) in the downlink (DL) from network to user equipment (UE), and both CP-OFDM and DFT-spread OFDM (DFT-S-OFDM) in the uplink (UL) from UE to network. As another example, NR DL and UL time-domain physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

FIG. 1 shows an exemplary configuration of NR user plane (UP) and control plane (CP) protocol stacks between a UE, a gNodeB (gNB, e.g., base station), and an access and mobility management function (AMF) in the 5G core network (5GC). Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for CP and UP.

PDCP provides header compression and retransmission for UP data. On the UP side, Internet protocol (IP) packets arrive to the PDCP layer as service data units (SDUs), and PDCP creates protocol data units (PDUs) to deliver to RLC. In addition, the Service Data Adaptation Protocol (SDAP) layer handles quality-of-service (QoS) including mapping between QoS flows and Data Radio Bearers (DRBs) and marking QoS flow identifiers (QFI) in UL and DL packets.

When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and establishes, configures, maintains, and releases DRBs and Signaling Radio Bearers (SRBs) used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on physical DL control channel (PDCCH) for pages from 5GC via gNB. A UE in RRC_IDLE state is not known to the gNB serving the cell where the UE is camping. However, NR RRC includes an RRC_INACTIVE state in which a UE is known (e.g., via context) by the serving gNB.

In NR, UL and DL data transmissions take place on physical UL shared channel (PUSCH) and physical DL shared channel (PDSCH), respectively. These data transmissions can take place with or without an explicit grant or assignment of resources by the network (e.g., gNB). In general, UL transmissions are usually referred to as being "granted" by the network (i.e., "UL grant"), while DL transmissions are usually referred to as being "assigned" by the network (i.e., "DL assignment"). For a transmission based on an explicit grant/assignment, the gNB sends DL control information (DCI) to a UE informing it of specific resources to be used for the transmission. The gNB scheduler issues the grant/assignment based on knowledge of DL data in the gNB buffer or UL data in the UE buffer, which the UE reports via buffer status report (BSR) and/or a one-bit scheduling request (SR).

In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS, for DL), configured grant (CG, for UL), or grant-free transmissions.

For NR UL, there are two types of configured grants. Type-1 are configured via RRC signaling only, while for Type-2, some parameters are preconfigured via RRC signaling and some PHY parameters are dynamically indicated. The RRC configuration of a UL configured grant includes various parameters, including a configuredGrantTimer value used for controlling operation of hybrid ARQ (HARQ) processes in the UL via a timer in the UE. A related feature is Autonomous Uplink (AUL), which is intended to support autonomous HARQ retransmissions (i.e., of the same transport block, TB) using an UL configured grant.

Considering beyond-5G (B5G) and/or 6G timelines, it is expected that new services and/or use cases will require both low latency (e.g., lower than in 5G) and high data rates (e.g., much higher than 5G). Another expectation is that these services with strict requirements will have various traffic patterns, including periodic/regular and non-periodic/irregular. An example low-latency B5G/6G use case is distributed artificial intelligence (AI) involving a group of (e.g., many) UEs that have inter-related, non-periodic data traffic patterns. Currently available techniques for dynamic and grant-free resource allocation are inadequate for such use cases with non-periodic traffic patterns and requirements for low latency.

SUMMARY

Embodiments of the present disclosure provide specific improvements to low-latency, non-periodic communication between user equipment (UEs) and a wireless network (e.g., radio access network, RAN), such as by providing, enabling, and/or facilitating solutions to overcome exemplary problems summarized above and described in more detail below.

Embodiments include methods (e.g., procedures) for a user equipment (UE) operating in a radio access network (RAN).

These exemplary methods can include receiving a resource allocation to transmit or receive data in the RAN. The resource allocation can include resources during a plurality of occasions, which can but are not required to be periodic. These exemplary methods can also include subsequently receiving one or more indications of whether the UE is allowed to transmit or receive during the occasions. Each particular indication is associated with a consecutive subset of the occasions subsequent to (e.g., immediately following) the particular indication.

In some embodiments, the resource allocation can be a dedicated resource allocation for the UE. In other embodiments, the resource allocation can be a group resource allocation for a group of UEs, including the UE.

In some embodiments, the one or more indications are associated with respective one or more subsets of a same number of the occasions. In some embodiments, the one or more indications do not include information describing the resources allocated during the respective one or more associated subsets of the occasions.

In some embodiments, each particular indication includes a bitmap of a plurality of bits that indicate whether the UE is allowed to transmit or receive in a corresponding plurality of the occasions of the associated subset.

In other embodiments, each particular indication can include one or more UE identifiers, and each UE identifier can correspond to one or more occasions of the particular subset associated with the particular indication. Additionally, each UE identifier indicates that, in the corresponding occasions of the particular subset, the identified UE is allowed to transmit or receive but other UEs are not allowed to transmit or receive.

In some embodiments, the one or more indications include a first indication associated with a first subset of the occasions.

In some of these embodiments, the one or more indications can include a second indication associated with a second subset of the occasions. A first occasion is included in the first subset and the second subset. In such embodiments, the first indication indicates that the UE is not allowed to transmit or receive during the first occasion, and the second indication indicates that the UE is allowed to transmit or receive during the first occasion.

In some of these embodiments, receiving the one or more indications can include sending a scheduling request (SR) to the RAN after receiving the first indication and receiving the second indication in response to the SR, which indicates that the UE has data to transmit. In other words, the second indication that the UE is allowed to transmit in the first occasion is based on the SR indicating that the UE has data to transmit.

In other of these embodiments, these exemplary methods can also include determining that the UE is allowed to transmit or receive during the first occasion based on the second indication being received after the first indication and one or more of the following: a rule prioritizing later-received indications; and the second indication including information indicating that it overrides the first indication.

In other of these embodiments, the first indication can be a group-common indication for a group of UEs including the UE, and the second indication can be a UE-specific indication. In such embodiments, these exemplary methods can also include determining that the UE is allowed to transmit or receive during the first occasion based on a rule prioritizing UE-specific indications over group-common indications. In some of these embodiments, the second subset includes a second occasion after the occasions of the first subset that is associated with the UE-specific indication. In such case, the UE may determine whether it is allowed to transmit or receive in the second occasion based on the group-common indication.

In some embodiments that include the first indication associated with the first subset, these exemplary methods can also include, when a second indication is not received after the first subset, determining whether the UE is allowed to transmit or receive during a second subset of the occasions that immediately follows the first subset based on applying one of the following default rules:

a first default rule that associates the first indication with the second subset;

a second default rule that the UE is not allowed to transmit or receive after the subset of occasions associated with the most recently received indication; and a third default rule that the UE is allowed to transmit or receive after the subset of occasions associated with the most recently received indication.

In some of these embodiments, the determining operations can include selecting between the first, second, and third default rules based on one of the following:
 information included with the first indication;
 information included with the resource allocation, or
 an RRC message received from the RAN before the first indication.

In some of these embodiments, these exemplary methods can also include, when the second indication is received after applying one of the default rules, determining that second indication overrides the applied default rule for any subsequent occasions of the second subset.

In some embodiments, each particular indication can be received in a group-common message that includes respective indications for UEs of a group that includes the UE. The respective indications can be associated with a same consecutive subset of occasions.

In some embodiments, these exemplary methods can also include, during each particular occasion, selectively transmitting or receiving data based on a most recently received indication associated with the particular occasion.

Other embodiments include exemplary methods (e.g., procedures) for a radio access network (RAN) node to allocate resources of the RAN.

These exemplary methods can include transmitting, to one or more UEs, a resource allocation to transmit or receive data in the RAN. The resource allocation can include resources during a plurality of occasions, which can but are not required to be periodic. These exemplary methods can also include subsequently transmitting one or more indications of whether the respective UEs are allowed to transmit or receive during the occasions. Each particular indication can be associated with a consecutive subset of the occasions subsequent to (e.g., immediately following) the particular indication:

In some embodiments, the resource allocation can be a dedicated resource allocation for the UE. In other embodiments, the resource allocation can be a group resource allocation for a group of UEs, including the UE. In some of these embodiments, these exemplary methods can also include selecting the UEs included in the group based on one or more of the following criteria:
 association with a common application or use case;
 within a common coverage area of the RAN node (e.g., cell, cell sector, beam);
 similar, correlated, or complementary traffic patterns; and
 similar or complementary requirements of latency, reliability, and/or quality of service.

In some embodiments, the one or more indications are associated with respective one or more subsets of a same number of the occasions. In some embodiments, the one or more indications do not include information describing the resources allocated during the respective one or more associated subsets of the occasions.

In some embodiments, each particular indication includes a bitmap of a plurality of bits that indicate whether a particular one of the UEs is allowed to transmit or receive in a corresponding plurality of the occasions of the associated subset.

In other embodiments, each particular indication can include one or more UE identifiers, and each UE identifier can correspond to one or more occasions of the particular subset associated with the particular indication. Additionally, each UE identifier indicates that, in the corresponding occasions of the particular subset, the identified UE is allowed to transmit or receive but other UEs are not allowed to transmit or receive.

In some embodiments, the one or more indications include a first indication associated with a first subset of the occasions.

In some of these embodiments, the one or more indications can include a second indication associated with a second subset of the occasions. A first occasion is included in the first subset and the second subset. In such embodiments, the first indication indicates that a particular UE is not allowed to transmit or receive during the first occasion, and the second indication indicates that the particular UE is allowed to transmit or receive during the first occasion.

In some of these embodiments, transmitting the one or more indications can include receiving a scheduling request (SR) from the particular UE after transmitting the first indication, and transmitting the second indication in response to the SR, which indicates that the UE has data to transmit.

In other of these embodiments, the second indication can indicate that the particular UE is allowed to transmit or receive during the first occasion based on being transmitted after the first indication and one or more of the following: a rule prioritizing later-received indications; and the second indication including information indicating that it overrides the first indication.

In other of these embodiments, the first indication can be a group-common indication for a group of UEs including the particular UE, and the second indication can be a UE-specific indication. In such embodiments, the second indication can indicate that the particular UE is allowed to transmit or receive during the first occasion based on a rule prioritizing UE-specific indications over group-common indications. In some of these embodiments, the second subset, can include a second occasion after the occasions of the first subset that is associated with the UE-specific indication. In such case, the group-common indication indicates whether the particular UE is allowed to transmit or receive in the second occasion.

In other of these embodiments, one of the following default rules applies to a second subset of the occasions that immediately follows the first subset, when a second indication is not transmitted after the first subset:
 a first default rule that associates the first indication with the second subset;
 a second default rule that UEs are not allowed to transmit or receive after the subset of occasions associated with the most recently received indication; and
 a third default rule that UEs are allowed to transmit or receive after the subset of occasions associated with the most recently received indication.

In some of these embodiments, these exemplary methods can also include indicating, to the particular UE, which of the first, second, and third default rules applies based on one of the following:
 information included with the first indication;
 information included with the resource allocation, or
 an RRC message transmitted before the first indication.

In some of these embodiments, when the second indication is transmitted after the first subset, the second indication overrides an applied default rule for any subsequent (e.g., remaining) occasions of the second subset.

In some embodiments, each particular indication can be transmitted in a group-common message that includes respective indications for UEs of a group that includes the one or more UEs. The respective indications can be associated with a same consecutive subset of occasions.

In some embodiments, these exemplary methods can also include selectively receiving or transmitting data with a particular one of the UEs based on a most recently transmitted indication associated with the particular occasion.

Other embodiments include UEs (e.g., wireless devices) and RAN nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or RAN nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes FIGS. 7A-B, shows an exemplary ASN.1 data structure for a ConfiguredGrantConfig information element (IE).

DETAILED DESCRIPTION

Figure 1:
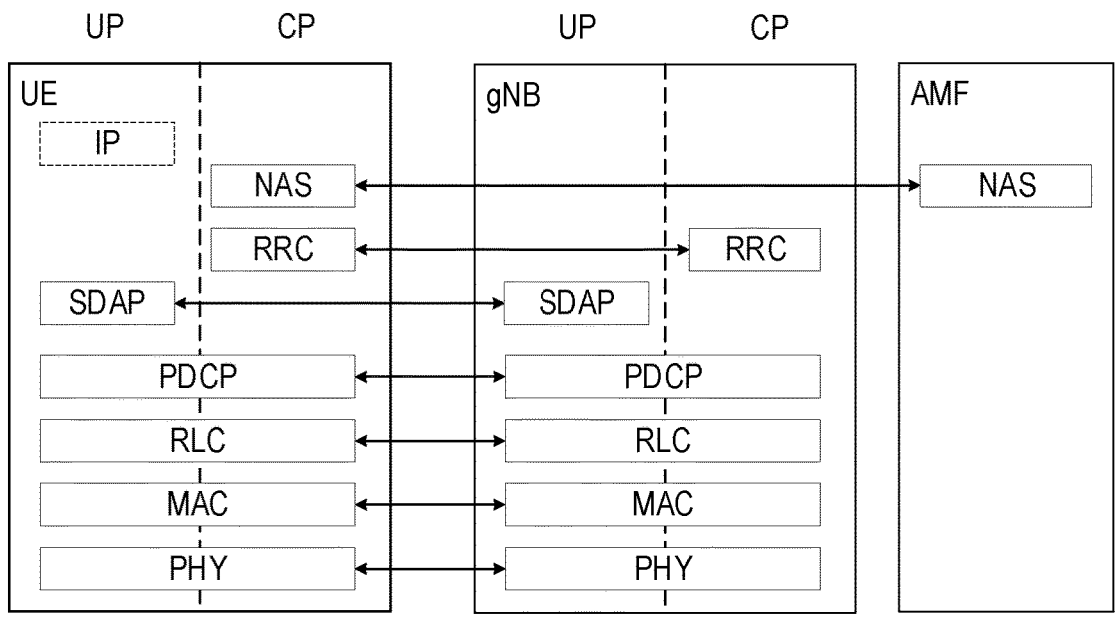
FIG. 1 shows an exemplary NR user plane (UP) and control plane (CP) protocol stacks.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

User plane (UP) latency control plays a crucial role in meeting end-to-end (E2E) latency requirements for services in current and future wireless networks. In a typical cellular network, such as LTE and NR, the network scheduler (e.g., in a base station) determines when and which UEs will transmit or receive data. As such, the scheduler practically dictates UP latency, and can be operated in various modes to meet different latency requirements.

As briefly mentioned above, considering beyond-5G (B5G) and/or 6G timelines, it is expected that new services and/or use cases will require both low latency (e.g., lower than in 5G) and high data rates (e.g., much higher than 5G). Another expectation is that these services will have various traffic patterns, including periodic/regular and non-periodic/irregular. Currently available techniques for dynamic and grant-free resource allocation are inadequate for use cases with non-periodic traffic patterns and requirements for low latency. This is discussed in more detail below, after an introduction to NR network architecture and PHY characteristics.

Figure 2:
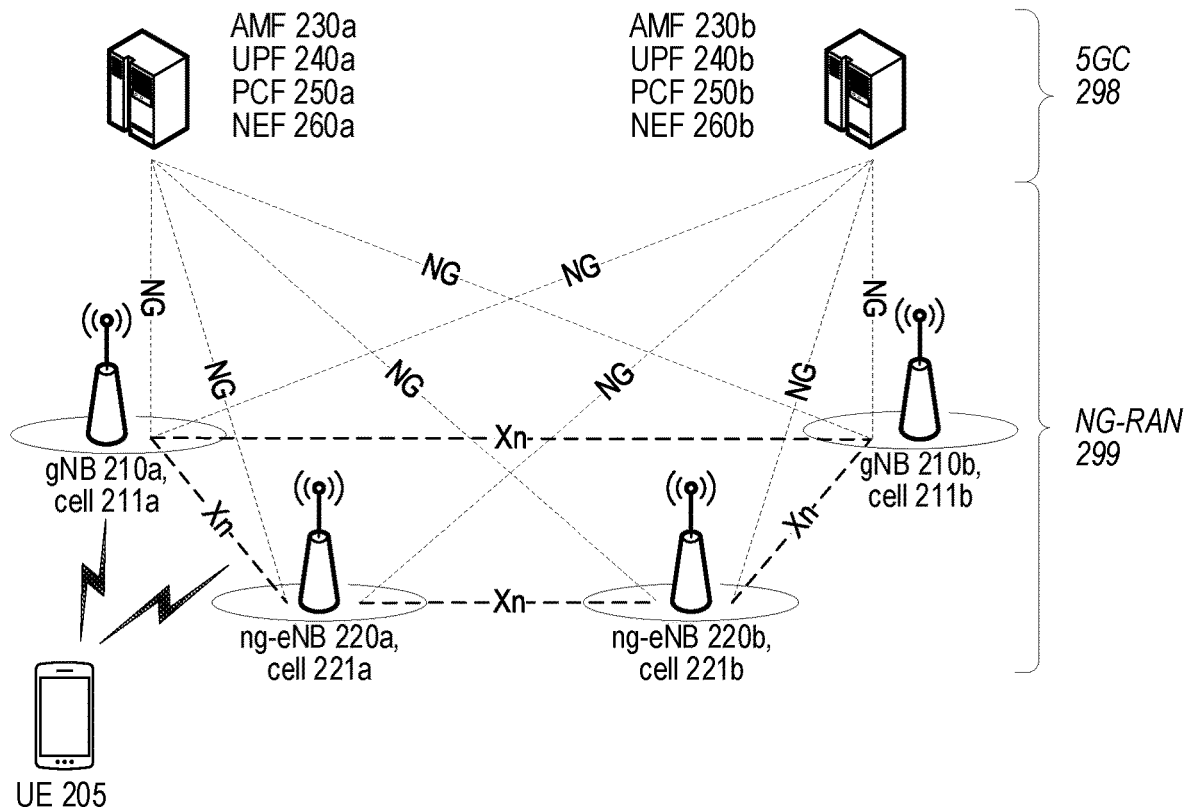
FIG. 2 illustrates a high-level views of an exemplary 5G/NR network architecture.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a,b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b).

Each of the gNBs 210 can support the NR radio interface including frequency division duplexing (FDD), time division duplexing (TDD), or a combination thereof. In contrast, each of ng-eNBs 220 can support the LTE radio interface but, unlike conventional LTE eNodeBs (eNBs), connect to the 5GC via the NG interface. Each of the gNBs and ng-eNBs can serve a geographic coverage area including one more cells, including cells 211a-b and 221a-b shown as exemplary in FIG. 2. The gNBs and ng-eNBs can also use various directional beams to provide coverage in the respective cells. Depending on the particular cell in which it is located, a UE 205 can communicate with the gNB or ng-eNB serving that cell via the NR or LTE radio interface, respectively.

The gNBs shown in FIG. 2 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU.

NR DL and UL physical resources are organized into equal-sized 1-ms subframes. A subframe is further divided into multiple slots of equal duration, with each slot including multiple OFDM-based symbols. An NR slot can include 14 OFDM symbols for normal cyclic prefix and 12 symbols for extended cyclic prefix. A resource block (RB) consists of a group of 12 contiguous OFDM subcarriers for a duration of a 12- or 14-symbol slot. A resource element (RE) corresponds to one OFDM subcarrier during one OFDM symbol interval.

Figure 3:
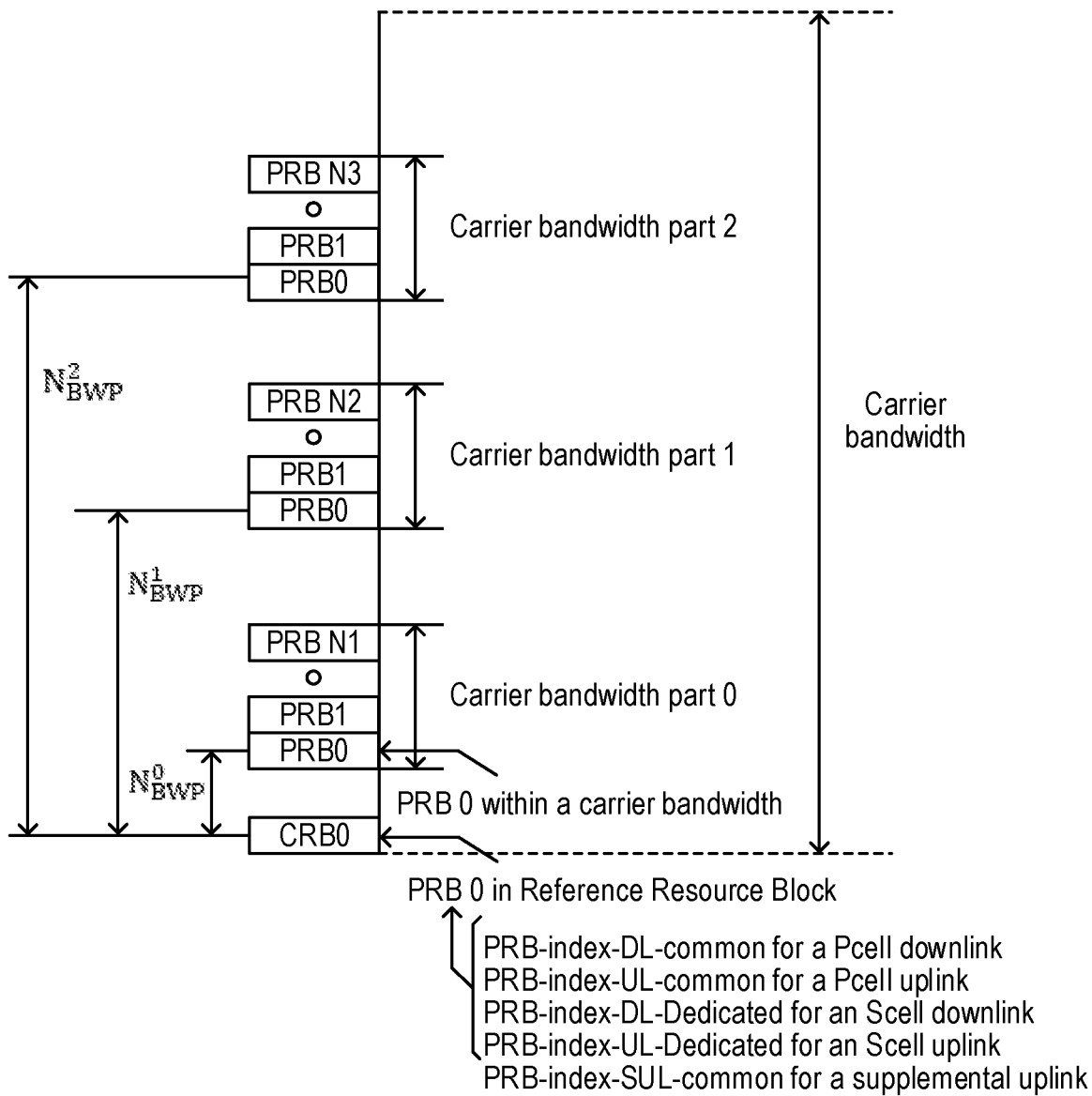
FIG. 3 shows an exemplary frequency-domain configuration for an NR user equipment (UE).

FIG. 3 shows an exemplary frequency-domain configuration for an NR UE. In Rel-15 NR, a UE can be configured with up to four carrier bandwidth parts (BWPs) in a DL carrier bandwidth with a single DL BWP being active at a given time. A UE can be configured with up to four BWPs in an UL carrier bandwidth with a single UL BWP being active at a given time. If a UE is configured with a supplementary UL, the UE can be configured with up to four additional BWPs in the supplementary UL carrier bandwidth, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:
  PRB-index-DL-common for DL in a primary cell (PCell, e.g., PCell or PSCell);
  PRB-index-UL-common for UL in a PCell;
  PRB-index-DL-Dedicated for DL in a secondary cell (SCell);
  PRB-index-UL-Dedicated for UL in an SCell; and
  PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $N_{BWPi}^{size}-1$, where i is the index of the particular BWP for the carrier. For example, as shown in FIG. 3, BWP0 includes PRBs 0 to N1, BWP1 includes PRBs 0 to N2, and BWP2 includes PRBs 0 to N3.

NR supports various SCS values $\Delta f=(15\times 2^\mu)$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu \cdot 50$ MHz. Table 1 below summarizes currently-supported NR numerologies and associated parameters. Different DL and UL numerologies can be configured by the network.

mini-slot arrangement in which the mini-slot begins in the third symbol of the slot and is two symbols in duration. Mini-slots can be used for unlicensed spectrum and latency-critical transmissions (e.g., URLLC). However, mini-slots are not service-specific and can also be used for eMBB or other services.

An NR slot can also be arranged with various time-division duplexing (TDD) arrangements of UL and DL symbols. These TDD arrangements include:
  DL-only (i.e., no UL transmission) slot with transmission late-start in symbol 1;
  DL-heavy, with one UL symbol and guard periods before and after the UL symbol to facilitate change of transmission direction;
  UL-heavy, with a single UL symbol that can carry DL control information; and
  UL-only with transmission on-time start in symbol 0 and the initial UL symbol usable to carry DL control information.

Figure 6:
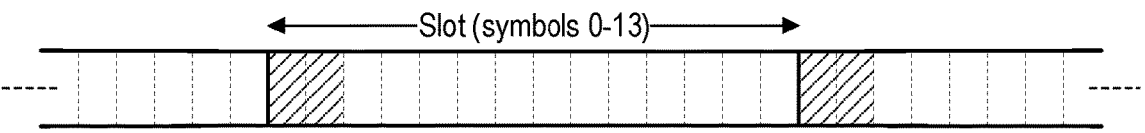
FIG. 6 shows an exemplary arrangement of control and data channels within an NR slot.

FIG. 6 shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain. The frequency bandwidth of the CORESET is variable. CORESET resources can be indicated to a UE by RRC signaling. The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. To assist a UE with channel estimation, multiple REGs can be grouped together to form a REG bundle, and

TABLE 1

| $\mu$ | $\Delta f = 2^\mu \cdot$ 15 (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 4:
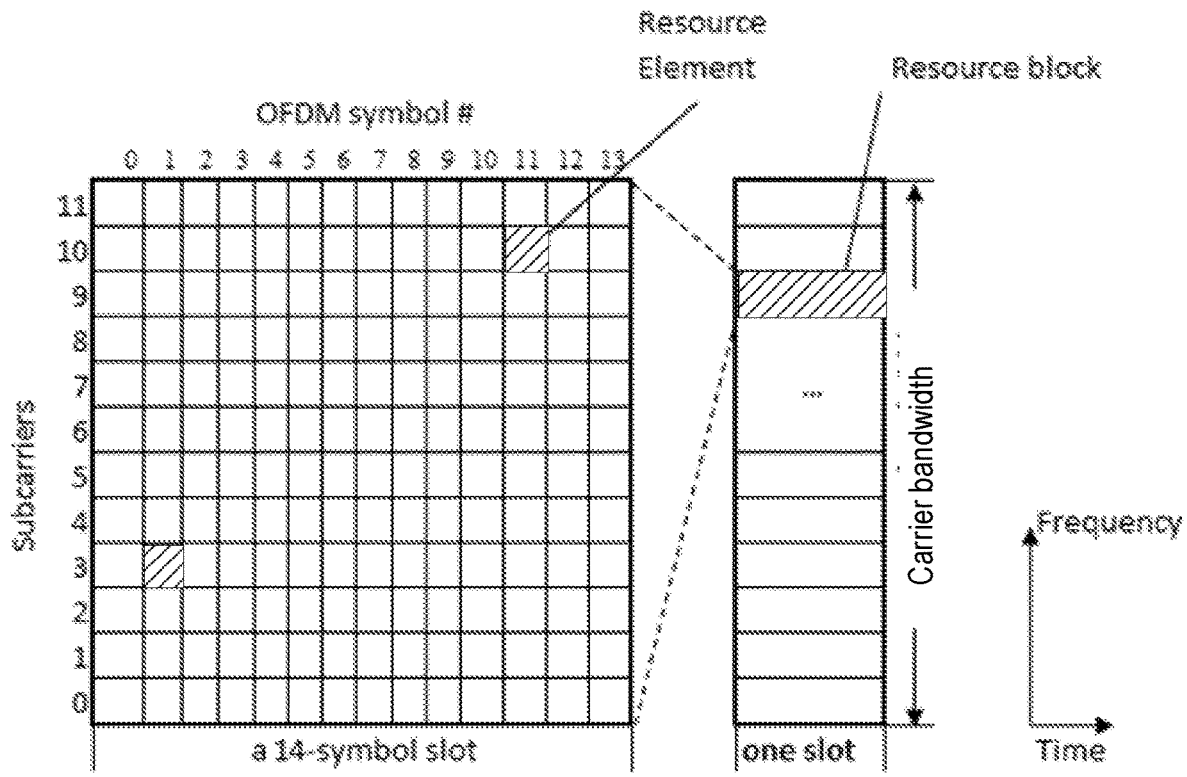
FIG. 4 shows an exemplary time-frequency resource grid for an NR slot.

FIG. 4 shows an exemplary time-frequency resource grid for an NR slot within a carrier bandwidth. As illustrated in FIG. 4, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix (e.g., as shown in FIG. 4) and 12 symbols for extended cyclic prefix.

Figure 5:
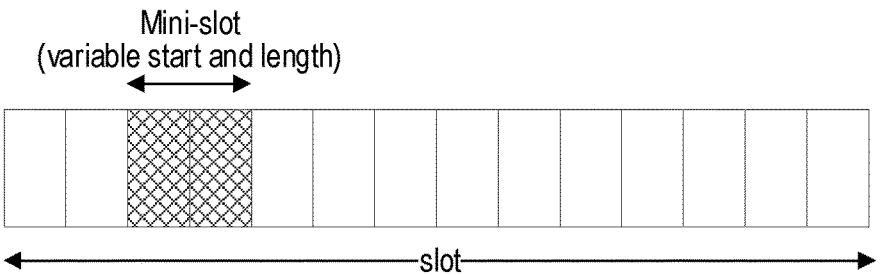
FIG. 5 shows an exemplary mini-slot arrangement for NR.

In addition, NR includes Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 5 shows an exemplary the REG bundle size (i.e., 2, 3, or 5 REGs) can be indicated to the UE. The UE can assume that any precoder used for transmission of PDCCH is the same over an entire REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

As mentioned above, NR data scheduling can be performed dynamically, e.g., on a per-slot basis. In each slot, the gNB transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 (v15.0.0) clause 5.1.3.1. Subsequently, the UE reads the redundancy version field (rv) in the DCI to determine the redundancy version. Based on this information, the number of layers ($\upsilon$), and the total number of allocated PRBs before rate matching ($n_{PRB}$), the UE determines the Transport Block Size (TBS) for the PDSCH according to the procedure defined in 3GPP TS 38.214 (v15.0.0) clause 5.1.3.2.

In summary, dynamic scheduling provides a single grant or assignment of resources (i.e., via DCI) to individual devices for an upcoming transmit time interval (TTI, e.g., slot). The grant or assignment tells UEs when and what transport format to use for an upcoming data transmission.

The scheduler issues UL resource grants based on knowledge of data stored in UE buffers via buffer status reports (BSRs). UEs may send BSRs using already-granted UL resources, or may send a one-bit scheduling request (SR) on PUCCH shared resources to request a grant of UL resources for BSR. The gNB may grant UL resources in response to the SR and may grant additional UL resources in response to the BSR. However, this process requires exchanging four messages and has two possible delays between request and grant. As such, dynamic scheduling is inadequate for services involving small but frequent delay-sensitive data transmissions, such as online game, ping, etc.

Prescheduling addresses these inadequacies by sending a (predictive) predefined grant of UL resources to a UE without knowledge of the UE's actual buffer status. If the size is sufficient, the UE may the granted resources to transmit buffered UL data. Otherwise, the UE can used the granted resources to report buffer status, from which the UE can receive a dynamic UL grant to transmit the buffered UL data. In case the UE has no UL data buffered at the time of predefined grant, it can refrain from using the granted resources.

One type of pre-scheduling is a configured grant (also called grant-free transmission). The basic idea is to configure a (predictive) predefined grant to a UE, which may use it when data arrives at the UE's buffer and no dynamic UL grant is available. Since the UE does not have to request UL resources when data arrives, a configured grant can be suitable for applications requiring low latency.

Two important parameters for configured (or predictive) grants are period and data size. Period refers to how often granted resources are available and data size refers to how much data can be carried by each of the periodically-granted resources. Configuration of these two parameters is usually a tradeoff between latency and resource utilization. Too large data size consumes resources very quickly as the number of UEs increases, but too small data size can cause segmentation of UE data (e.g., over multiple periods) and thus longer latency. In practice, configured grants should be conservative, with reasonably small data size targeted to allow BSR or single ping packet transmission.

Different types of delay-sensitive services may have a range of traffic behavior, and it is desirable to adapt pre-scheduled resources according to service type. One approach is dynamic TDD, in which the scheduler dynamically changes transmission direction in slots according to traffic needs. In contrast to TDD patterns where UL and DL slots are static, the time duration in between two neighboring UL slots in dynamic TDD can vary from frame to frame. Periodic scheduling via configured grant must take this variation into account when setting grant parameters.

NR supports two types of pre-configured UL resources, both of which are similar to LTE semi-persistent scheduling (SPS) with some enhancements such as support for transport block (TB) repetitions. In type 1, UL data transmission with configured grant is based only on RRC configuration without any L1 signaling. Type 2 is similar to the LTE SPS feature, where some parameters are preconfigured via RRC and some physical layer parameters are configured via MAC scheduling. L1 signaling is used for activation/deactivation of a type-2 grant. For example, a gNB explicitly activates the configured resources on PDCCH and the UE confirms reception of the activation/deactivation grant using a MAC control element.

FIG. 7, which includes FIGS. 7A-B, shows an exemplary ASN.1 data structure for a ConfiguredGrantConfig information element (IE) used for RRC configuration of NR type-1 and type-2 UL configured grants. The IE shown in FIG. 7A includes an srs-ResourceIndicator field that points to one of the UL sounding reference signal (SRS) resources in an SRS resource configuration provided by the network via RRC signaling. The SRS resource can also be configured with a spatial relation to a DL RS (e.g., SSB or CSI-RS) or another UL SRS resource. In other words, the UE should transmit PUSCH based on the UL configured grant using the same precoder or beamforming weights as used for the transmission of the SRS identified by the srs-ResourceIndicator field and the SRS resource configuration.

For both types, UL periodicity is configured via the periodicity field in FIG. 7. Table 2 below summarizes periodicities (in symbols) supported for various subcarrier spacing (SCS).

TABLE 2

| SCS (kHz) | Periodicity (symbols) | n (slots) |
| --- | --- | --- |
| 15 | 2, 7, n*14 | 1, 2, 4, 5, 8, 10, 16, 20, 32, 40, 64, 80, 128, 160, 320, 640 |
| 30 | 2, 7, n*14 | 1, 2, 4, 5, 8, 10, 16, 20, 32, 40, 64, 80, 128, 160, 256, 320, 640, 1280 |
| 60 (normal CP) | 2, 7, n*14 | 1, 2, 4, 5, 8, 10, 16, 20, 32, 40, 64, 80, 128, 160, 256, 320, 512, 640, 1280, 2560 |
| 60 (extended CP) | 2, 6, n*12 | 1, 2, 4, 5, 8, 10, 16, 20, 32, 40, 64, 80, 128, 160, 256, 320, 512, 640, 1280, 2560 |
| 120 | 2, 7, n*14 | 1, 2, 4, 5, 8, 10, 16, 20, 32, 40, 64, 80, 128, 160, 256, 320, 512, 640, 1024, 1280, 2560, 5120 |

Additionally, a periodicityExt parameter was introduced to support finer granularities than periodicity, and is defined in 3GPP TS 38.331 v.16.2.0 as follows:

TABLE 3

| SCS (kHz) | Periodicity (symbols) | periodicityExt |
| --- | --- | --- |
| 15 | periodictyExt*14 | 1-640 |
| 30 | periodictyExt*14 | 1-1280 |
| 60 (normal CP) | periodictyExt*14 | 1-2560 |
| 60 (extended CP) | periodictyExt*12 | 1-2560 |
| 120 | periodictyExt*14 | 1-5120 |

For Type 1 configured grants, time resources are configured via RRC signalling:
 timeDomainAllocation: index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).
 timeDomainOffset: Offset of a resource with respect to SFN=0 in time domain.

For Type2 configured grants, the periodicity is configured by RRC in the same way as for Type1, but the slot offset is dynamically indicated by the slot in which the UE receives the DCI that activates the Type2 configured grant. In contrast to Type1, the time domain allocation of PUSCH is indicated dynamically by DCI via the time domain resource assignment field (i.e., slot/length indicator value, SLIV) in the same way as for scheduled (non-CG) PUSCH.

A configuredGrantTimer (CGT) is used to prevent an UL CG from overriding and/or pre-empting a TB scheduled with a dynamic grant (i.e., new transmission or retransmission), or an initial TB with another UL CG (i.e., new transmission). However, there is no explicit HARQ ACK/NACK in Rel-15. Rather, the gNB implicitly indicates an ACK by providing an UL grant for a new transmission.

Expiration of the CGT indicates an ACK for a HARQ process associated with the UL CG. The CGT is (re)started for an associated HARQ process upon PUSCH transmission based on a dynamic grant (i.e., new transmission or retransmission) or a configured grant (i.e., new transmission). The CGT is stopped when the UE has received a PDCCH indicating configured grant Type 2 activation, or upon an implicit ACK for the associated HARQ process (i.e., a grant for a new transmission).

In NR Rel-15, only an initial transmission of a TB is allowed to use either type of an UL CG. In other words, any HARQ retransmissions of a TB must rely on dynamic UL grant, which is indicated via PDCCH addressed to the UE's configured scheduling RNTI (CS-RNTI). NR Rel-16 introduced autonomous uplink (AUL), which supports autonomous HARQ retransmission using a CG. In this arrangement, a new UE timer (referred to as "CG retransmission timer" or CGRT for short) is used to protect the HARQ procedure so that the retransmission can use the same HARQ process for both transmission and retransmission of a transport block (TB) of UL data. CGRT is configured by the parameter cg-RetransmissionTimer shown in FIG. 7. The CGRT is started for a HARQ process configured with AUL upon the data transmission using a configured grant, and a retransmission using another configured grant is triggered when the CGRT expires.

This functionality helps the UE to avoid a HARQ process being stalled in case a gNB has missed the HARQ transmission initiated by UE. However, an observed issue is that a UE may just repetitively initiate autonomous HARQ retransmissions for a HARQ process for a long duration, but the gNB may not successfully receive the transmissions, e.g., due to bad radio channel quality or repetitive listen-before-talk (LBT) failures in case of a shared channel. This is undesirable since the data in the TB may no longer be useful and further retransmission attempts would unnecessarily congest the channel and affect the latency of other packets in the UL buffer.

The UE may eventually trigger RLC-layer retransmission for an RLC PDU that is undergoing HARQ retransmissions. However, the retransmitted RLC PDU would occupy a different HARQ process, such that the UE would then maintain two HARQ processes in transmission for the same RLC PDU and the gNB's RLC receiver may receive duplicate RLC PDUs. This may create problems with wraparound of RLC sequence number. In addition, the second received RLC PDU may be treated as new data and passed to upper layers rather than being dropped as a duplicate.

Therefore, it is necessary to introduce a limit on UE-triggered AUL retransmissions for a HARQ process. To address this issue, the existing CGT is configured to indicate the maximum amount of time for the UE to complete transmission of an HARQ process. When the CGT expires, the UE should flush the HARQ buffer for this HARQ process and transmit new data associated with it. If both CGT and CGRT are configured for a HARQ process, both timers can be operated in parallel. In this way, the UE can perform HARQ retransmission using CG resources for a HARQ process while CGT is running for the process. The value used for CGT should be longer than the value used for CGRT.

Figure 8:
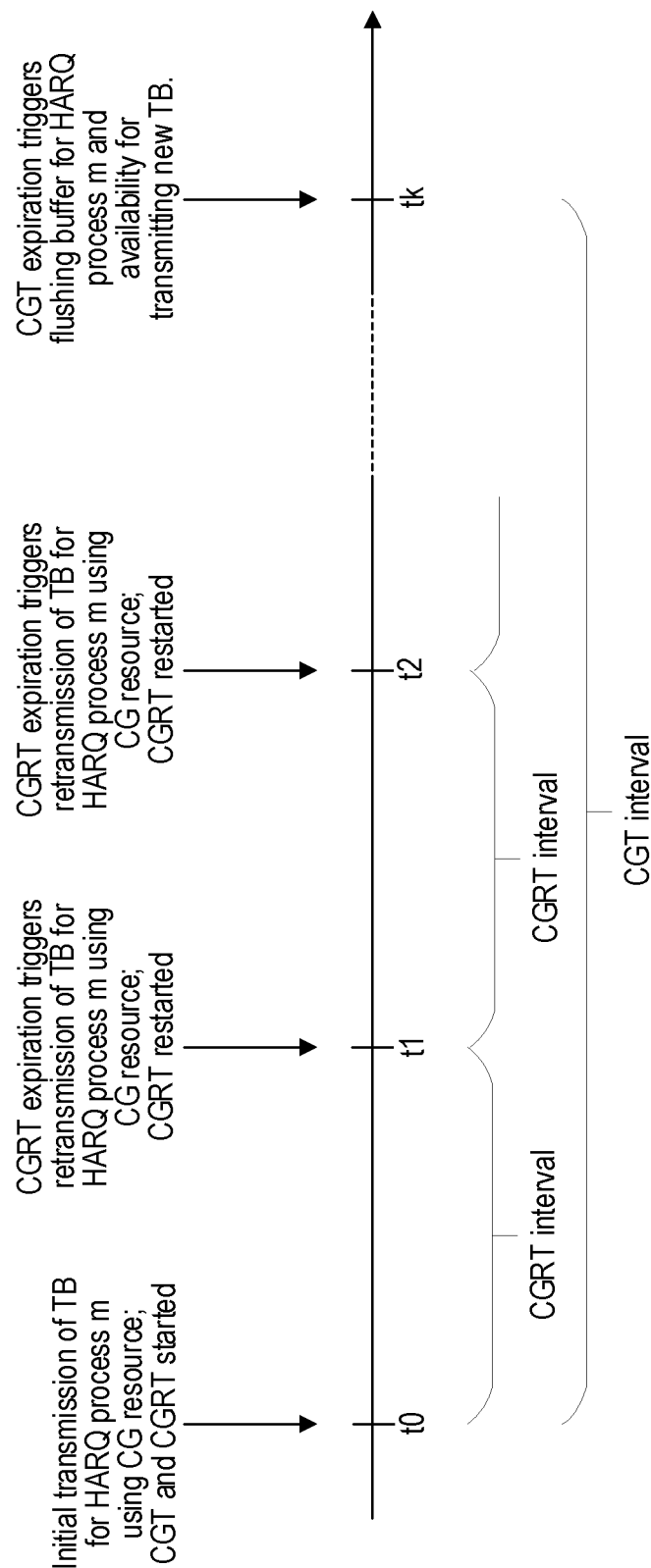
FIG. 8 shows an exemplary procedure for limiting autonomous uplink (AUL) transmissions for a hybrid ARQ (HARQ) process.

An example of the above-described procedure is illustrated in FIG. 8. An initial transmission of a TB for HARQ process m occurs at t0 using a CG resource, causing the UE to start CGT and CGRT. The CGRT interval expires at t1 while the CGT is still running, causing the UE to retransmit the TB for HARQ process m using the CG resource and restart the CGRT. The same process occurs at t2. The CGT interval expires at a subsequent time tk, causing the UE to flush the TB from the buffer for HARQ process m and make this HARQ process available for transmitting a new TB.

A UE can be provided with multiple active UL CGs for the UE's active bandwidth part (BWP) in the UE's serving cell. The availability of multiple CGs can, for example, enhance reliability and reduce latency for critical services. In addition, NR operation in unlicensed spectrum (e.g., NR-U), multiple CGs are under consideration as a means for allowing a UE to switch to slot-based transmissions after initiating the COT (channel occupancy time) to minimize DMRS and UCI overhead.

There can be one or more HARQ processes in the HARQ process pool assigned to each CG configuration. There is also a separate CGT timer and CGRT setting associated with each CG configuration. HARQ processes can also be shared between CG configurations, which can increase flexibility and avoid depletion of limited HARQ process space for the UE.

A logical channel (LCH) can be mapped to multiple CG configurations, such that the UE can transmit data of the LCH using multiple active CG resources at the same time. If a TB was transmitted using a CG resource, the TB can be retransmitted using the CG resource (among the set of CG resources mapped to the LCH) that comes earliest in the time, which helps to reduce the latency. However, the CG resource selected for retransmission should be the same size as the CG resource used for the initial transmission to avoid the need for rate-matching. In addition, the UE shall use the same HARQ process for transmission and retransmission of a TB.

The CGT timer for a HARQ process shall be started only when the TB using this HARQ process is initially transmitted. The value of the CGT timer is set according to the configuration of the CG resource used for the initial transmission. In parallel, the CGRT shall be (re)started for every transmission/retransmission attempt. For example, if an initial TB transmission uses a resource in CG configuration 1, the CGRT is started using the timer value included in CG configuration 1. If the TB retransmission is performed with the resource in CG configuration 2, the CGRT need to be restarted using the timer value included in CG configuration 2.

The HARQ process number field in an UL DCI (e.g., formats 0_0 and 0_1) scrambled by CS-RNTI is used to indicate which CG configuration is to be activated/deactivated/reactivated and which CG configurations are to be released. In the DCI, NDI in the received HARQ information is 0. Upon reception of an activation/deactivation/reactivation command, the UE sends the gNB a confirmation MAC CE that includes a bitmap in which each bit position corresponds to a particular one of the CG configurations, e.g., the bit position corresponds to the CG index.

TB repetition is also supported in NR, with the same resource configuration being used for all K repetitions of a TB, where K also includes the initial transmission. Possible values of K are {1, 2, 4, 8}. The parameters repK and repK-RV in FIG. 7 define the K repetitions to be applied to the transmitted transport block and the redundancy version (RV) pattern to be applied to the repetitions, respectively. The n-th transmission occasion of the K repetitions (n=1, 2, . . . , K) is associated with the (mod(n−1,4)+1)-th value in the configured RV sequence. The initial transmission of a transport block may start at:
- the first transmission occasion of K repetitions if the configured RV sequence is {0, 2, 3, 1},
- any of the transmission occasions of K repetitions that are associated with RV=0 if the configured RV sequence is {0, 3, 0, 3},
- any of the transmission occasions of K repetitions if the configured RV sequence is {0, 0, 0, 0}, except the last transmission occasion when K=8.

For any RV sequence, the repetitions shall be terminated after transmitting K repetitions, or at the last transmission occasion among the K repetitions within a periodicity (P), or when a UL grant for scheduling the same TB is received within P, whichever condition is reached first. The UE is not expected to be configured with the time duration for the transmission of K repetitions larger than the time duration derived by P.

For both Type 1 and Type 2 PUSCH transmissions with a configured grant, when the UE is configured with repK>1, the UE shall repeat the TB across the repK consecutive slots applying the same symbol allocation in each slot. If the UE determines that the symbols allocated for PUSCH are DL symbols according to the slot configuration, the multi-slot PUSCH transmission is omitted in that slot.

DL-SPS is a scheme similar to semipersistent scheduling in LTE. A semi-static resource scheduling pattern is signaled in advance to the device. Upon activation by L1/L2 control signaling, which also includes parameters such as the time-frequency resources and coding-and-modulation scheme to use, the device receives DL data transmissions according to the preconfigured pattern. In DL SPS, a periodicity of the DL data transmission is configured via RRC signaling and activation is via PDCCH similar to dynamic scheduling, but using CS-RNTI instead of C-RNTI. PDCCH also provides time-frequency resources and other necessary parameters in a similar way as dynamic scheduling. The HARQ process number is derived from the starting time of the DL data transmission according to a formula.

Upon activation of DL-SPS, the UE receives DL data transmission periodically according to the RRC-configured periodicity using the transmission parameters indicated by the PDCCH DCI activating the transmission. Hence, control signaling is only used once and the overhead is reduced. After enabling SPS, the UE continues to monitor the set of candidates PDCCHs for UL and DL scheduling DCI. This is useful in the case that there are occasional transmissions of large amounts of data for which the DL-SPS allocation is insufficient. It is also used to handle HARQ retransmissions that are dynamically scheduled.

Configured UL grants and DL SPS can be particularly useful for ultra-reliable low-latency communications (URLLC) services. Additionally, several techniques are available to make URLLC more resilient to interference from enhanced mobile broadband (eMBB) services. These are summarized below.

One UL cancellation technique uses UL power control to increase the transmission power of UL URLLC data to make it more resilient to interference from the eMBB users. The main advantage with this technique is that it does not require any changes to eMBB UEs, such that it will work with Rel-15 UEs. However, the URLLC UE's transmit power spectral density (PSD) may have to be increased significantly to guarantee performance with interfering eMBB traffic, which can cause interference to other cells. Also, UEs not in close vicinity of the gNB may not have the power budget for such an increase, and thus will not have the Signal to Interference and Noise Ratio (SINR) necessary to maintain performance.

A second technique is based on a cancellation indicator. When a URLLC UE is scheduled on time/frequency resources that are already scheduled for a lower priority eMBB UE, the gNB can transmit a cancellation indicator to the eMBB UE. Upon reception of this indicator, the eMBB UE will avoid transmitting on a set of preconfigured resources.

The mechanism for UL cancellation indication (CI) includes a reference time-frequency region that is configured for the UE by RRC signaling, and a DCI that indicates parts of the configured resources within which the transmission should be cancelled. The reference time-frequency region is also referred to as "reference resource" (RR). The size of the cancellation indication DCI as well as the time-domain granularity are configurable. The frequency-domain granularity can then be determined from the total bit field size and the time-domain granularity.

A typical use case for the cancellation indicator is when eMBB traffic is scheduled on all PRBs for an entire slot and time sensitive URLLC traffic needs to be transmitted. In this context, "time sensitive" means that the traffic requires instant access to the channel and waiting until the next slot will introduce unacceptable delay. URLLC traffic maybe be scheduled on one or a few OFDM symbols in a slot, and with a significantly shorter scheduling delay between scheduling DCI and scheduled UL transmission. In such case, eMBB users may already have been scheduled on all available time/frequency resources during the slot, but the gNB can send the cancellation indicator to cancel some of the eMBB traffic and reduce the interference to the URLLC UE.

Once DL URLLC data appears in a buffer, a base station (e.g., gNB, ng-eNB) should choose the earliest moment of time when resources can be normally allocated without colliding with resources allocated for an ongoing DL transmission for the intended UE. This may be in the beginning of a slot or a mini-slot. Hence, DL pre-emption may happen when long term allocation(s) (e.g., slot based) occupy resources (e.g., wideband resources) and there is no room for URLLC data transmission, which is often supported using a mini-slot. In this case, the scheduler can send DCI to inform the intended URLLC UE that an override (also referred to as "pre-emption") has been triggered for the ongoing DL transmission.

When a slot-based eMBB transmission is pre-empted, the pre-empted part of the original message pollutes the UE soft buffer, since only noise/interference is received. It is therefore important to flush the affected bits from the soft buffer to improve the likelihood of decoding the other, correctly-received eMBB data at the UE. If not, the pre-empted bits may negatively impact decoding in retransmissions, which will likely happen. Rel-15 provides multiple options for DCI based indication of the pre-emption by explicit signaling.

As a first option, this can be done by DCI format 2_1 over group common PDCCH, as defined in 3GPP TS 38.213 (v15.12.0) section 7.3.1.3.2 and 11.2. This first option provides the indication as a 14-bit bitmap, which addresses reference DL resource domains in between two pre-emption indication messages. Highest resource resolution of this indication is one OFDM symbol and one-half BWP, but not at the same time. In general, the resolution becomes coarser as message periodicity increases. Since this is group-common signaling, all UEs using the BWP may read it.

As a second option, this can be done by special flag in multi-CBG retransmission DCI "CBG flushing out information", as defined in 3GPP TS 38.213 (v15.12.0) section 7.3.1.2. This option provides user-specific signaling. The HARQ retransmission DCI, which contains a set of CB/CBGs, may have a special bit to indicate that the UE must overwrite (i.e., do not combine) existing bits in the soft buffer by retransmitted code block (CB) or CB group (CBG) soft bits. In this case, the base station is responsible for determining a subset of CB/CBGs that needs to be flushed before UE soft combining.

As explained below, these techniques for dynamic and grant-free resource allocation are inadequate for use cases with non-periodic traffic patterns and requirements for low latency. Dynamic allocation is designed for flexibility to traffic demands and/or patterns, but it has signaling inefficiencies that increase latency. At a minimum, this requires a SR and DCI allocating subsequent grant before UL transmission. If the not grant is not fitting, the UE sends BSR and data transmission together, and the UE gets another grant in a second DCI for subsequent transmission. So, two or four signaling messages must be exchanged before data transmission can occur, which adds considerable latency can be problematic for ultra-low latency for a large variety of traffic.

These issues are particularly relevant in situations in which DL control channel resources for sending resource assignment are scarce. In such scenarios, although many UEs may need to receive a resource grant/allocation, the actual number of UEs that could be scheduled is limited by available DL control channel resources.

Grant-free allocation is designed for low-latency periodic traffic when SPS/CG is allocated with frequent periodicity but is inefficient for non-periodic traffic, e.g., resources are wasted for allocation instances with no data to send. As such, the focus of 5G low-latency solutions is periodic traffic, e.g., in factory automation scenarios. On the other hand, the network can use a longer period of the allocation to accommodate the fact that the UE doesn't have a periodic pattern, but this increases latency since data arriving in the transmission buffer must wait longer for a transmission opportunity.

Accordingly, Applicant has recognized that there is no current solution that provides flexible resource grant/allocation with low signaling overhead for transmission patterns that are non-periodic but nonetheless are relatively known (e.g., somewhat regular, or at least not completely irregular). For such a pattern, a single allocation event similar to CG/SPS could be beneficial.

Applicant has also recognized that a fundamental reason for high signaling overhead is that conventional grant/allocation mechanisms are resource centric. In other words, whenever an allocation is modified, the scheduling DCI includes all information (e.g., resource allocation and transmission encoding/decoding parameters) about the resource allocation to be modified. For example, when cancellation/pre-emption DCIs are used to prohibit certain transmission (e.g., when higher-priority UEs are prioritized over a certain resource), the cancellation DCI must indicate all the reference resources for the cancelled or pre-empted occasions. This can cause significant signaling overhead if the occasions are spread over large range of reference resources. More generally, the signaling size or amount does not vary much between new and modified allocations, nor with amount of data to be transmitted.

Applicant has also recognized that many 6G use cases are based on distributed AI. UEs involved in distributed AI (also referred to as AI agents in this context) intrinsically form a "group", with some relationships among traffic patterns of these UEs. For example, an AI agent may transmit some data based on data transmission of another AI agent. The network could leverage upon this relationship by sharing resources among AI agents of the group. However, a group of AI agents are handled independently separately from a scheduling point of view, whereby each AI agent has a separate resource assignment with consequent high signaling overhead. Given a limited amount of signaling resources in a cell, this restriction may limit the number of distributed AI agents that a cell can support.

Accordingly, exemplary embodiments of the present disclosure provide flexible and efficient techniques to dynamically activate, deactivate, and/or modify a pre-configured resource allocation (e.g., CG/SPS) for a one or more UEs, such as a group of UEs. These techniques are based on changing resource allocation from the conventional "resource-centric" approach to a new "occasion-centric" approach. Here "occasion" refers to a single time interval of the pre-configured allocation, which can be managed separately from other intervals from a resource allocation standpoint. For example, an "occasion" can correspond to a CG periodicity, discussed above.

In these techniques, a network can send to one or more UEs indications of whether the respective UEs are allowed to transmit or receive during the occasions within the pre-configured allocation. An example discussed in more detail below is a bitmap in which each bit indicates usage of a particular occasion, also referred as "bitmap DCI" for convenience. The number of occasions covered by the bitmap depends on its length, i.e., the number of bits that it contains. For example, the network indicates the occasions that are allowed and are not allowed to be used by the intended recipient UE(s).

In various embodiments, each bitmap DCI can be unicast and/or dedicated to a particular UE, or a single bitmap DCI can contain multiple bitmaps corresponding to multiple UEs. In any case, the network can arrange the respective bitmaps to maintain orthogonality of the resource allocation between multiple UEs, such that the UEs will not interfere or transmit during the same occasion. Compared to conventional scheduling mechanism, these techniques facilitate dynamic resource allocation with much lower signaling overhead since the bitmap DCI does not carry resource-related information. In other words, there is no change of resource allocation but only an indication of allowed/not-allowed transmission occasions. The bitmap DCI can be arranged in different ways discussed below, but generally based on knowledge of UE (non-periodic) traffic pattern over the applicable occasions.

Another novel, flexible, and efficient technique to reduce signaling overhead is a group-common activation message for a pre-configured allocation/grant. For example, after the network provides a pre-configured allocation that is common to a group of UEs, the network sends a group activation DCI to all group members. As such, there is no need to transmit UE-specific activation DCI (with resource information) to all UEs of the group. The group activation DCI can be used independently of or together with the bitmap DCI embodiments discussed above.

Embodiments of the present disclosure can provide various benefits and/or advantages, in addition to those discussed above. For example, embodiments can be more spectrally efficient than conventional CG/SPS, by allowing a group of UEs to share a single periodic grant or allocation. Since each UE's traffic pattern is irregular, the spectral resources needed to meet application latency requirements are less than if each UE was allocated independent periodic resources. In other words, embodiments can avoid the waste of resource that occurs when conventional periodic resource allocations (e.g., CG or SPS) are used for non-periodic traffic.

As another example, embodiments can require less signal overhead in comparison to conventional dynamic resource allocation. The usage of bitmap-based DCIs and/or group activation DCIs reduces the need for PDCCH resources. A bitmap DCI indicates multiple occasions without including other transmission parameters, which remain as previously configured. Likewise, embodiments are more flexible and have lower overhead than conventional cancellation or preemption schemes used in 5G/NR Also, group activation DCIs avoid sending multiple activation DCIs to individual group members. These advantages facilitate improved PDCCH resource efficiency, thereby increasing the number of UEs that can be supported in a cell and/or avoiding overly-constrained PDCCH resources.

As another example, embodiments can facilitate improvements to group-based use cases, such as a group of cooperative UEs involved in a distributed AI model in an industrial scenario. All members of the group can be aware of group-allocated resources, based on a single common pre-configured grant and (optionally) a group activation DCI. Moreover, bitmap DCI(s) facilitate awareness and/or coordination among group members, thereby preventing and/or reducing interference while maintaining low latency that is important for such scenarios.

Certain advantages of the disclosed techniques in relation to conventional dynamic scheduling can be quantified as follows. Using a bitmap DCI that indicates and/or applies to N UL occasions, a minimum of 2 signaling messages (initial allocation+initial bitmap DCI) and a maximum of N+1 signaling messages (initial allocation+bitmap DCI per occasion) are required. In contrast, for dynamic UL resource allocation, a minimum 2N signaling messages (SR+scheduling DCI per occasion) and a maximum of 4N signaling messages (SR+BSR+2 scheduling DCI per occasion) are required.

Similarly, when using a bitmap DCI that indicates and/or applies to N DL occasions, a minimum of 2 signaling messages (initial allocation+bitmap DCI depicting N occasions) and a maximum of N+1 signaling messages (initial allocation+bitmap DCI per occasion) are required. In contrast, N signaling messages are required for dynamic DL resource allocation (scheduling DCI grant for each occasion).

Less control signaling can also improve latency. Signaling messages that are incorrectly decoded by the recipient may need to be retransmitted, which can increase latency. In general, each signaling message will have a decoding error probability that is related to message size and channel conditions, among other things. As such, fewer signaling messages per occasion and/or smaller signaling messages (e.g., bitmap DCI) introduce fewer decoding errors per occasion, resulting in an overall reduction in average latency. Similarly, fewer and/or smaller signaling messages (including retransmissions) can free up constrained signaling capacity (e.g., PDCCH) for other needs and/or purposes.

In relation to conventional UL CG or DL SPS, which only include periodic resource allocations, embodiments can facilitate tuning and/or adjusting a periodic resource allocation to be compatible with non-periodic traffic patterns of various UEs. With some degree of knowledge about such non-periodic traffic patterns (e.g., based on information obtained from the UE, other network nodes or functions, etc.), the network can allocate individual occasions of a periodic resource allocation to different UEs, thereby increasing utilization of periodic resource allocations as compared to conventional UL CG or DL SPS.

Although embodiments are often described below in terms of UL non-periodic traffic patterns, similar principles and/or techniques are applicable to DL non-periodic traffic patterns. In other words, the term "resource allocation" can represent an UL pre-configured resource allocation (e.g., similar to UL CG) or a DL pre-configured resource allocation (e.g., similar to DL SPS). In the following, the term "configured grant" (or CG) may be used to refer to such an UL pre-configured resource allocation, which may be the same as or different from a conventional UL CG used in 5G/NR networks. Furthermore, embodiments described herein are applicable to operation in either licensed or unlicensed (or shared-access) spectrum (e.g., NR or NR-U).

FIGS. 9-12 show various communications between a RAN node (e.g., gNB) 904 and a group of UEs (UE1 901, UE2 902, and UE3 903) that illustrate various embodiments of the present disclosure. For brevity, the following description of FIGS. 9-12 will refer to these nodes without their respective reference numbers.

Figure 9:
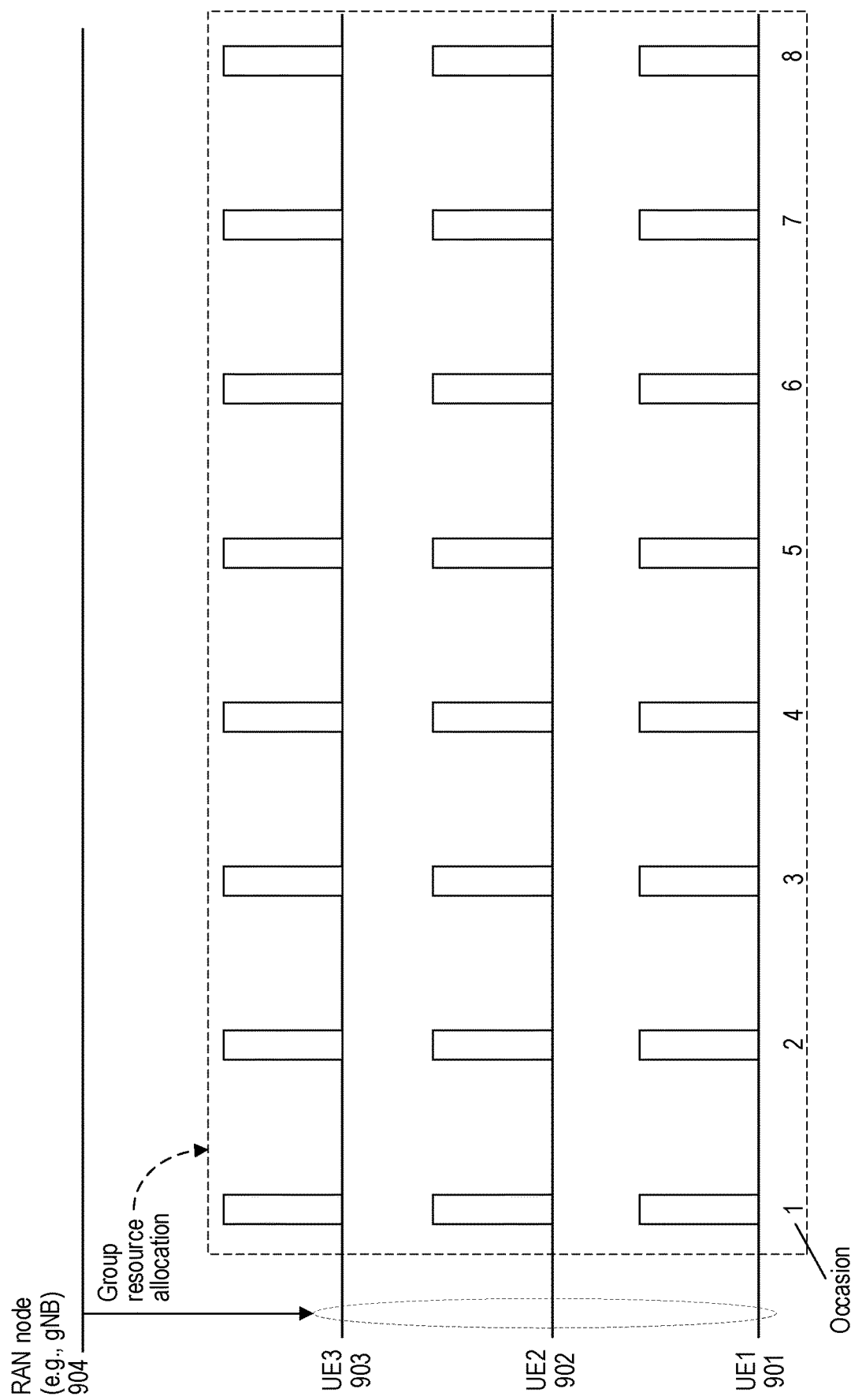
FIGS. 9-12 show various communications between a RAN node and a group of UEs (UE1, UE2, and UE3) that illustrate various embodiments of the present disclosure.

As shown in FIG. 9, the RAN node provides a group resource allocation to the group of UEs. In other words, the resource allocation is intended to be shared by the UEs of the group. In the example shown in FIG. 9, the resource allocation is for UL resources and includes eight (8) occasions (numbered 1-8). These occasions may be periodic occasions, e.g., as defined by a periodicity parameter included in the resource allocation. The resource allocation can also identify specific time resources (e.g., symbols and/or timeslots) and frequency resources (e.g., RBs and/or BWPs) during each of the occasions, in a similar manner as UL CGs discussed above.

Figure 10:
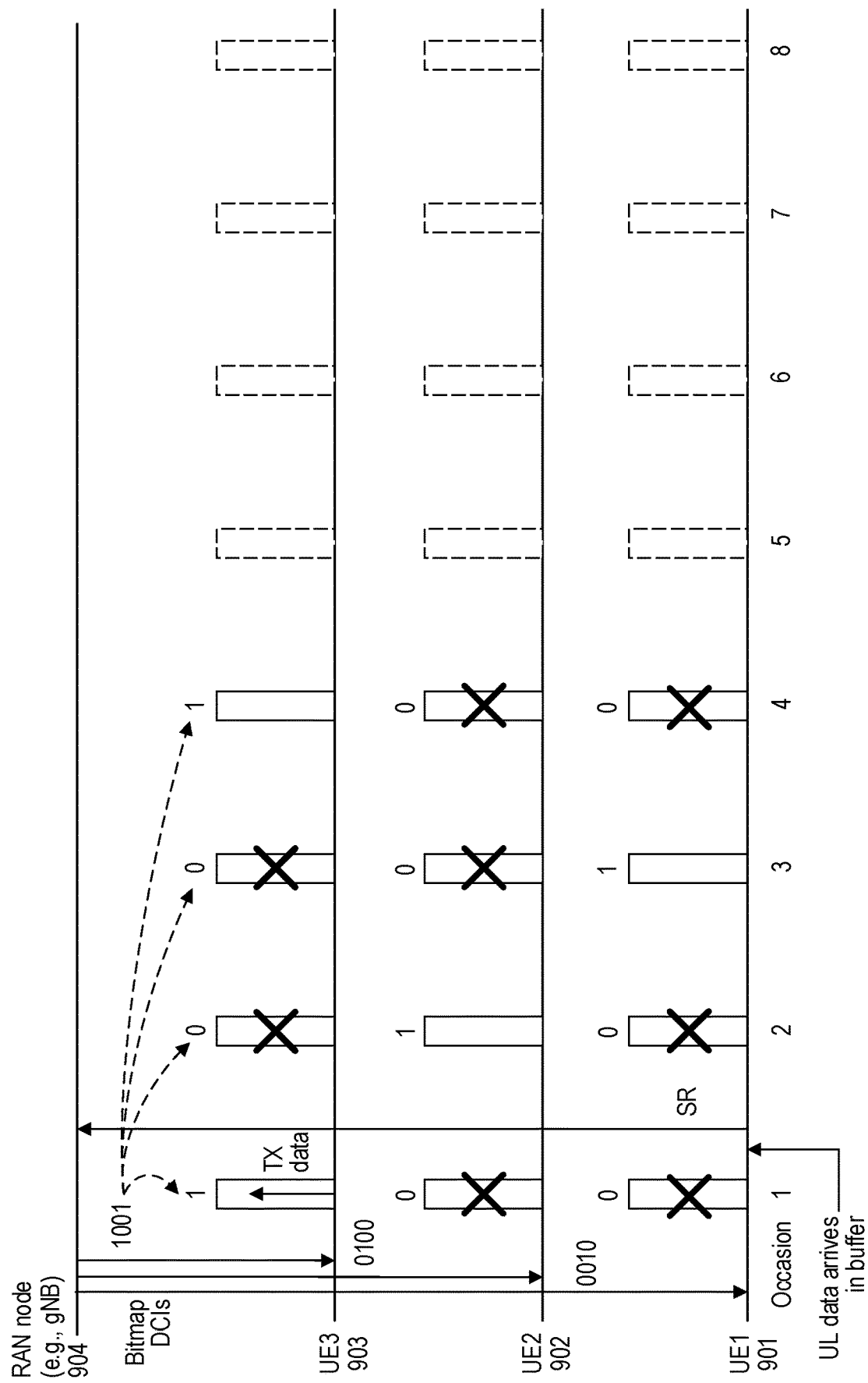
Figure 11:
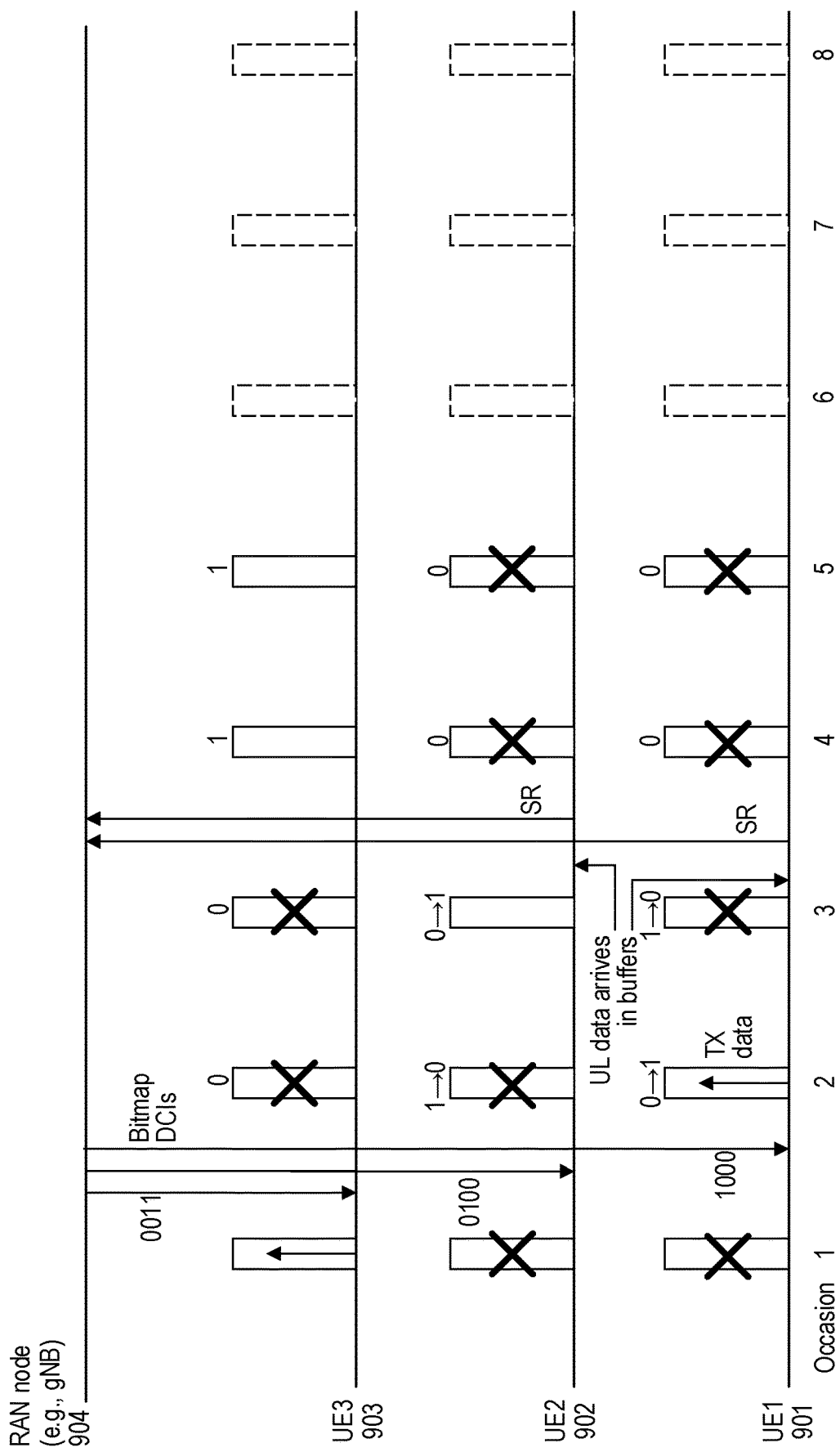
Figure 12:
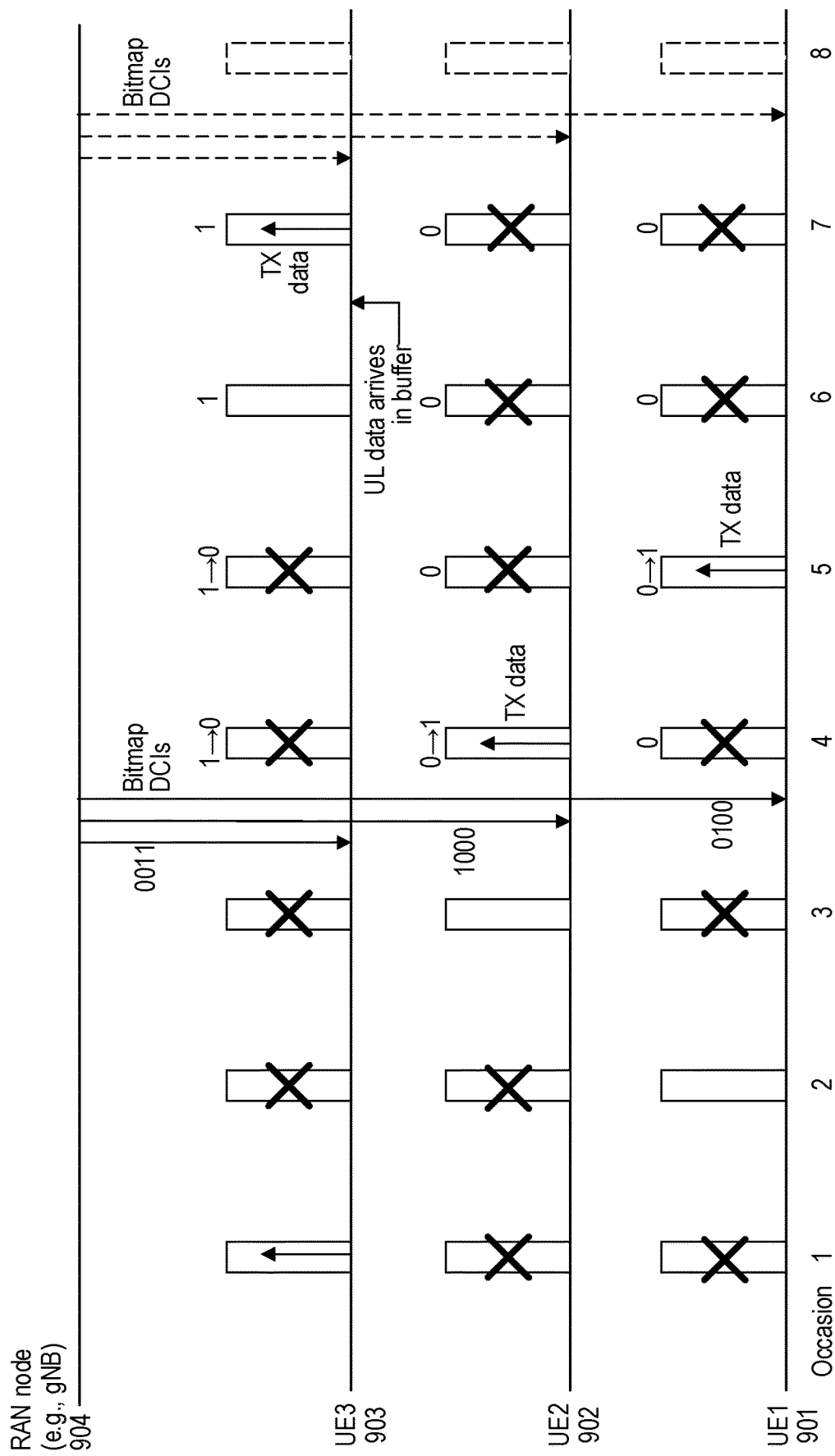

As shown in FIG. 10, prior to occasion 1, the RAN node sends indications to the respective UEs of the group about whether each of the UEs is allowed to transmit during a subset of the occasions that immediately follow the indications. In FIGS. 10-12, these indications are referred to as "bitmap DCIs", but this is only used as an example indication. In particular, each bitmap DCI address to a particular UE indicates whether that UE is allowed to transmit in each of the next four (4) occasions. In other words, each bit in a bitmap corresponds to a particular one of the next four occasions.

Note that the bitmap DCIs do not contain information describing the allocated resources for the associated occasions. As such, techniques exemplified by FIGS. 9-12 can be considered "occasion-centric" whereas conventional techniques that include resource allocation information in each scheduling message can be considered "resource-centric".

In the example shown in FIG. 10, the bitmap DCI sent to UE3 contains "1001" indicating that UE3 is allowed to transmit in occasions 1 and 4 but not in occasions 2 and 3. Similarly, the bitmap DCI sent to UE2 contains "0100" indicating that UE2 is allowed to transmit in occasion 2 but not in occasions 1, 3, and 4. Likewise, the bitmap DCI send to UE1 contains "0010" indicating that UE1 is allowed to transmit in occasion 3 but not in occasions 1-2 and 4. In this manner, each of the UEs can be provided resources of the shared allocation that are orthogonal to resources provided to other UEs of the group. Put differently, different UEs are allowed to transmit in different occasions of the resource allocation, thereby preventing inter-group interference.

In FIG. 10, based on the received indication of allowance for occasion 1, UE3 transmits UL data (shown as "TX data") using the resources allocated in occasion 1. The transmitted UL data may have arrived in UE3's buffer before or after receiving the bitmap DCI. Additionally, UL data arrives in UE1's buffer after occasion 1, causing UE1 to send a scheduling request (SR) or other traffic pattern indication to the RAN node. For sake of brevity, "SR" will be used herein to refer to any type of indication of a UE's UL traffic pattern that is relevant for subsequent indications of allowance.

FIG. 11 shows further communications after the RAN node receives the SR from UE1. In this example, the RAN node sends new bitmap DCIs to UE1, UE2, and UE3 in response to UE1's SR. These bitmap DCIs indicate allowance for immediately following occasions 2-5. In this example, these allowance indications in these bitmap DCIs preempt, cancel, override, and/or supersede the allowance indications for occasions 2-4 in the previously received bitmap DCIs (FIG. 10). This is shown in FIG. 11 by the change of allowance (i.e., 0-1 or 1-0) for UEs 1-2 in occasions 2-3. This illustrates the general principle that data arrival for one UE of the group can affect previously-indicated allowed occasions for other UEs of the group, but this can be handled efficiently with bitmap DCIs.

In particular, the bitmap DCI send to UE1 contains "0010" indicating that UE1 is allowed to transmit in occasion 2 but not in occasions 3-5. Based on this indication of allowance, UE1 transmits the buffered data using the resources allocated in occasion 2. Similarly, the bitmap DCI sent to UE2 contains "0100" indicating that UE2 is allowed to transmit in occasion 3 but not in occasions 2 and 4-5. Likewise, the bitmap DCI sent to UE3 contains "0011" indicating that UE3 is allowed to transmit in occasions 4-5 but not in occasions 2-3. FIG. 11 also shows that UL data arrives in the buffers of UE1 and UE2 after occasion 3, which causes these two UEs to send SRs to the RAN node.

FIG. 12 shows further communications after the RAN node receives the SRs from UE1 and UE2. In this example, the RAN node sends new bitmap DCIs to UE1, UE2, and UE3 in response to these SRs. These bitmap DCIs indicate allowance for immediately following occasions 4-7. In this example, these allowance indications in these bitmap DCIs preempt, cancel, override, and/or supersede the allowance indications for occasions 4-5 in the previously received bitmap DCIs (shown in FIG. 11). This is shown in FIG. 12 by the change of allowance (i.e., 0-1 or 1-0) for UE3 in occasions 4-5, UE2 in occasion 4, and UE3 in occasion 5.

In particular, the bitmap DCI send to UE1 contains "0100" indicating that UE1 is allowed to transmit in occasion 5 but not in occasions 4 and 6-7. Based on this indication of allowance, UE1 transmits the buffered data ("TX data") using the resources allocated in occasion 5. Similarly, the bitmap DCI sent to UE2 contains "1000" indicating that UE2 is allowed to transmit in occasion 4 but not in occasions 5-7. Based on this indication of allowance, UE2 transmits the buffered data ("TX data") using the resources allocated in occasion 4. Likewise, the bitmap DCI sent to UE3 contains "0011" indicating that UE3 is allowed to transmit in occasions 6-7 but not in occasions 4-5. UL data arrives in UE3's buffer after occasion 6 and, based on the indication of allowance, UE3 transmits the buffered data ("TX data") using the resources allocated in occasion 7.

FIG. 12 also shows that the RAN node optionally sends new bitmap DCIs to UE1, UE2, and UE3 before occasion 8. This may occur in embodiments where UEs of the group require explicit indication of whether they are allowed to transmit in each of the occasions of the resource allocation.

In other words, each bitmap DCI is only valid for the immediately following subset of occasions (e.g., occasions 4-7 for the bitmap DCIs sent after occasion 3).

In other embodiments, UEs of the group may not require explicit indication of whether they are allowed to transmit in each of the occasions. In some of these embodiments, if a bitmap DCI applies to the next N occasions and the UE does not receive a subsequent bitmap DCI after the Nth next occasion, then the UE can determine and/or infer that the same bitmap DCI should also apply to another N immediately following occasions. In other words, the allowance pattern of the bitmap DCI is repeated every N occasions until the UE receives another bitmap DCI. In the example shown in FIG. 12, UEs 1-3 would also apply the bitmap DCIs received before occasion 4 to occasions 8-11.

In other of these embodiments, if a bitmap DCI applies to the next N occasions and the UE does not receive a subsequent bitmap DCI after the Nth next occasion, then the UE can determine that is allowed to transmit in all occasions until the UE receives another bitmap DCI.

In a variant, the UE can determine that it is not allowed to transmit in any of the occasions until the UE receives another bitmap DCI. Applying this variant to FIG. 12, the UEs would determine that they are not allowed to transmit in occasion 8 (and subsequent occasions) when no bitmap DCIs are received after occasion 7.

In some embodiments, the group of UEs can be configured for how to interpret allowance for subsequent occasions of the group resource allocation in the absence of an explicit bitmap DCI associated with these subsequent occasions. For example, the interpretation rule can be provided by the RAN node together with the bitmap DCI, together with the resource allocation, or via separate RRC signaling. An example format is an index to a table of predetermined rules.

In some embodiments, the group of UEs can be configured with multiple resource allocations. In such embodiments, the RAN node can include with each bitmap DCI an indication of the associated resource allocation. For example, if each resource allocation is associated with a unique identifier (i.e., recognizable by the UEs), the RAN node can include the associated identifier with the bitmap DCI. For example, the identifier can be an allocation index, e.g., based on order in which the allocations were configured.

As a more specific example, a group of UEs could be configured with two periodic resource allocations, each having a different period such that the occasions of the two allocations do not (or at least only minimally) coincide. Based on knowledge of each UEs UL or DL traffic, the RAN node can select most appropriate occasions for each UE from the two allocations. Each bitmap DCI will include an identifier of the allocation from which the occasions were selected. These embodiments can be extended to more than two allocations having different periods, which can be selected by the RAN node so that the aggregated allocation closely approximates a known or predicted non-periodic traffic pattern from the group of UEs.

In some embodiments, the RAN node can send bitmap DCIs as UE-specific DCIs (e.g., dedicated/unicast) or group-common DCIs (i.e., broadcast/multicast). In such embodiments, UEs can apply various rules and/or criteria to determine priority between UE-specific bitmap DCIs and group-common DCIs that have conflicting allowance indications for one or more occasions. Such rules and/or criteria can include any of the following:

- Most recently received DCI has priority.
- UE-specific bitmap DCI always has priority over group-common DCI.
- Later-received UE-specific bitmap DCI has priority over earlier-received group-common DCI, but only for overlapping occasions. In other words, the group-common DCI applies to any remaining occasions after the overlapping occasions.
- Based on information included in the bitmap DCI, indicating whether it has priority over earlier-received DCIs.

In some embodiments, UEs of the group can be configured for how to handle priority between UE-specific and group-common bitmap DCIs. This can be done, for example, via RRC signaling, NAS signaling, or information with a bitmap DCI (as mentioned above).

In some embodiments, the RAN node can send a group-common activation message that activates a resource allocation for the group of UEs. As an example, this group activation message can be a group activation DCI sent via PDCCH. In the context of the example of FIGS. 9-10, the RAN node can send a group activation DCI to the group of UEs after sending the group resource allocation (FIG. 9) but before sending the initial bitmap DCIs (FIG. 10). Alternately, the initial bitmap DCIs sent to the group of UEs can be interpreted as an implicit group activation message. For example, the initial bitmap DCIs can be sent as a group-common DCI, which may include an explicit indication of group activation and/or be interpreted by the UEs as an implicit group activation. In such embodiments, UE transmission in an occasion is based not only on allowance for the occasion but also on activation of the resource allocation.

In some embodiments, a UE may be further restricted for transmitting in occasions indicated as allowed by one or more rules and/or criteria related to the data available for transmission (i.e., in addition to availability of any data). In some cases, such rules and/or criteria can be included with a bitmap DCI indicating the allowed occasions. Alternately, such rules and/or criteria can be configured via RRC signaling (e.g., together with the resource allocation) or predetermined (e.g., specified by 3GPP). Below are some examples of rules and/or criteria which would cause a UE to refrain from transmitting data in an occasion indicated as allowed for the UE:

- No data available for one or more logical channels (LCHs) or groups of logical channels (LCGs) that are associated with the resource allocation (e.g., URLLC LCHs);
- Available data has a priority level that is less than a priority level associated with the resource allocation;
- Available data has a reliability requirement (e.g., eMBB) that is less than a reliability level associated with the resource allocation (e.g., URLLC); and/or
- Available data has a latency requirement (e.g., eMBB) that is greater than a latency level associated with the resource allocation (e.g., URLLC).

In other embodiments, after transmitting all available data in an allowed occasions according to the rules and/or criteria (e.g., all high-priority data), the UE can use any remaining resources allocated during the allowed occasion to transmit other available data that does not meet the rules and/or criteria (e.g., other lower-priority data). For example, if UE has insufficient URLLC data to fill the resources of an allowed occasion, then UE can also transmit eMBB traffic in remaining resources of the allowed occasion.

As mentioned above, in some embodiments the RAN node can send a group-common bitmap DCI to the UEs of the group. In some embodiments, the group-common bitmap DCI can include N tuples {UE_ID, bitmap(UE_ID)} for a group of N UEs. UE_ID can be an explicit UE identifier or an index into a table of UE identifiers, where the table is known (e.g., previously configured) between the RAN node and the group of UEs. Alternatively, the UE_ID can be implicit based on the ordering within the group-common bitmap DCI. For example, the first bitmap DCI can be for the first group member (e.g., UE1 in FIGS. 9-12), the second bitmap DCI can be for the second group member (e.g., UE2), etc.

In other embodiments, the indication of allowance for the subset of immediately following occasions can include respective indications of the particular UE that is allowed to transmit or receive in each of the occasions. For four occasions and UEs 1-3, an exemplary indication of allowance according to these embodiments can be {UE1, UE2, UE3, UE1}. Various identifiers or indices can be used to represent the allowed UEs, in a similar manner as discussed above. An advantage of such embodiments is explicit orthogonality by having a single indicator for each occasion that can only identify one UE.

In other embodiments, the indication of allowance for the subset of immediately following occasions can include respective multi-bit indications corresponding to each of the occasions. For example, rather than a bitmap of single-bit allowance indications, the allowance indication for each occasion can take on more than two values, with each of the values indicating a particular type of data traffic that is allowed during the corresponding occasion. As a more specific example, a value of "0" for a particular occasion can indicate no traffic is allowed, a value of "1" can indicate that only highest-priority traffic is allowed, a value of "2" can indicate that medium- or high-priority traffic is allowed, and a value of "3" can indicate that all traffic is allowed. A similar arrangement can be used for other traffic differentiators, including reliability, latency, logical channel, etc.

In some embodiments, each UE can send feedback to the RAN node about whether each bitmap DCI was successfully decoded by the UE. This can prevent and/or mitigate uncertainty about which UEs of the group have decoded and applied their respective UE-specific bitmap DCIs (or a single group-common bitmap DCI). In various alternative, the UEs can send the feedback as UCI over PUCCH or as MAC CE or other feedback message over PUSCH.

Feedback may be useful when each bitmap DCI indicates allowance for a relatively large number of occasions, such that the RAN node may not send another bitmap DCI until much later, after the end of the occasions. As such, the RAN node may want to employ feedback to increase reliability of individual bitmap DCIs. On the other hand, if each bitmap DCI indicates allowance for a relatively small number of occasions, then feedback may not be necessary because, even if UE does not transmit on an allowed occasion or transmits on an occasion when it is not allowed, the number of such occasions will be very few until the RAN node sends another bitmap DCI.

In some embodiments, the feedback can be acknowledgement (ACK) only. When a UE is able to decode a bitmap DCI, it sends an ACK on the feedback resource, but if UE is unable to decode the bitmap DCI it sends nothing. Hence, the RAN node becomes aware of which UEs of the group have not responded to a bitmap DCI and can resend allowance indication to those as a group-common or UE-specific bitmap DCI. ACK-only can be preferred in scenarios with small groups of UEs and/or relatively high reliability requirement (e.g., URLLC).

In other embodiments, the feedback can be negative ACK (NACK) only. When a UE is not able to decode a bitmap DCI, it sends a NACK on the feedback resource, but if UE is able to decode the bitmap DCI it sends nothing. Hence, the RAN node becomes aware of which UEs of the group have responded to a bitmap DCI and can resend allowance indication to those as a group-common or UE-specific bitmap DCI. There might be cases of false NACKs when no bitmap DCI is sent, but the RAN node is aware of and can ignore those NACKs. NACK-only feedback can be preferred for scenarios with large groups of UEs (e.g., reduced feedback overhead assuming most UEs correctly decode bitmap DCIs) and/or relatively low reliability requirement.

However, there may be situations where a UE does not sense energy of a bitmap DCI and therefore does not attempt to decode the bitmap DCI. In such case, the UE will not send a NACK and the RAN node is not aware that the UE did not receive the bitmap DCI. ACK-only or ACK-NACK feedback can be used to address such scenarios.

In other embodiments, no explicit feedback is used. If a UE had not decoded/received the bitmap DCI, then the UE does not perform any transmission on occasions indicated as allowed for the UE by the bitmap DCI. This implicitly indicates that either the UE had no data to transmit or the UE did not correctly receive the bitmap DCI. In many cases, a UE having data to transmit may send a subsequent SR to the RAN node, which can then send another bitmap DCI indicating allowed occasion(s) for the UE.

In some embodiments, UEs of the group can be configured with a bitmap DCI feedback mode (e.g., ACK-only, NACK-only, ACK-NACK, or no feedback). This can be done, for example, via RRC signaling, NAS signaling, or information included with a bitmap DCI. In some embodiments, the RAN node can flexibly configure bitmap DCI feedback mode based on particular scenarios and/or requirements. For example, if there is a group with a large number of UEs or a relatively low reliability requirement, the RAN node can configure UEs of the group for NACK-based feedback. However, if the number of UEs in the group later shrinks or a reliability requirement increases, the RAN node can reconfigure UEs remaining in the group for ACK-based feedback.

In some embodiments, the RAN node can have information about traffic patterns of the UEs of the group, which the RAN node can determining the group resource allocation and/or the occasions allowed for each of the UEs. One way the RAN node can obtain such information is directly from the UEs, such as the SRs shown in FIGS. 10-11 or buffer status reports (BSRs) sent in the resources of the allowed occasions.

In other embodiments, the RAN node can receive UE traffic pattern information from another network node or function, such as a UPF in the 5GC (or equivalent in a 6G network) or an application function (AF, e.g., server) that communicates with the group of UEs. In other embodiments, the RAN node can use artificial intelligence/machine learning (AI/ML) algorithms to predict UE traffic patterns. This can be based on SRs and/or BSRs received from the various UEs of the group, information provided by the DL scheduler, as well as other relevant traffic pattern information provided by another node or function, or by the UEs (e.g., application-related information). For example, the RAN node can estimate UL and/or DL traffic patterns for UEs of the group based on BSR/SR arrival periodicity, BSR size, DL data packet size and/or arrival periodicity, etc. The RAN node can also estimate a variance or distribution of such traffic patterns.

The RAN node can determine the pre-configured resource allocation (e.g., UL CG or DL SPS) based on the estimated traffic patterns for the group of UEs. Moreover, if the traffic patterns of the group change with time, then the RAN node can provide updated bitmap DCIs indicating allowance, which is much simpler and easier than deactivating and reactivating the pre-configured allocation as done conventionally. This use can be particularly beneficial for Release-18 or beyond, e.g., extended reality (XR) traffic with a relatively fixed periodicity but varying amounts of data.

In some embodiments, the RAN node can select the UEs included in the group. This selection can be based on one or more of the following criteria:
- association with a common application or use case (e.g., industrial automation);
- within a common coverage area (e.g., cell, cell sector, beam, etc.);
- similar, correlated, and/or complementary traffic patterns; and
- similar and/or complementary requirements of latency, reliability, and/or quality-of-service (QoS).

An exemplary group of UEs with a correlated traffic pattern is two UEs that transmit with the same period but whose transmissions do not coincide and/or are out-of-phase. An exemplary group of UEs with complementary latency requirements is a first UE requiring low latency and a second UE that can tolerate higher latency than the first UE.

Figure 13:
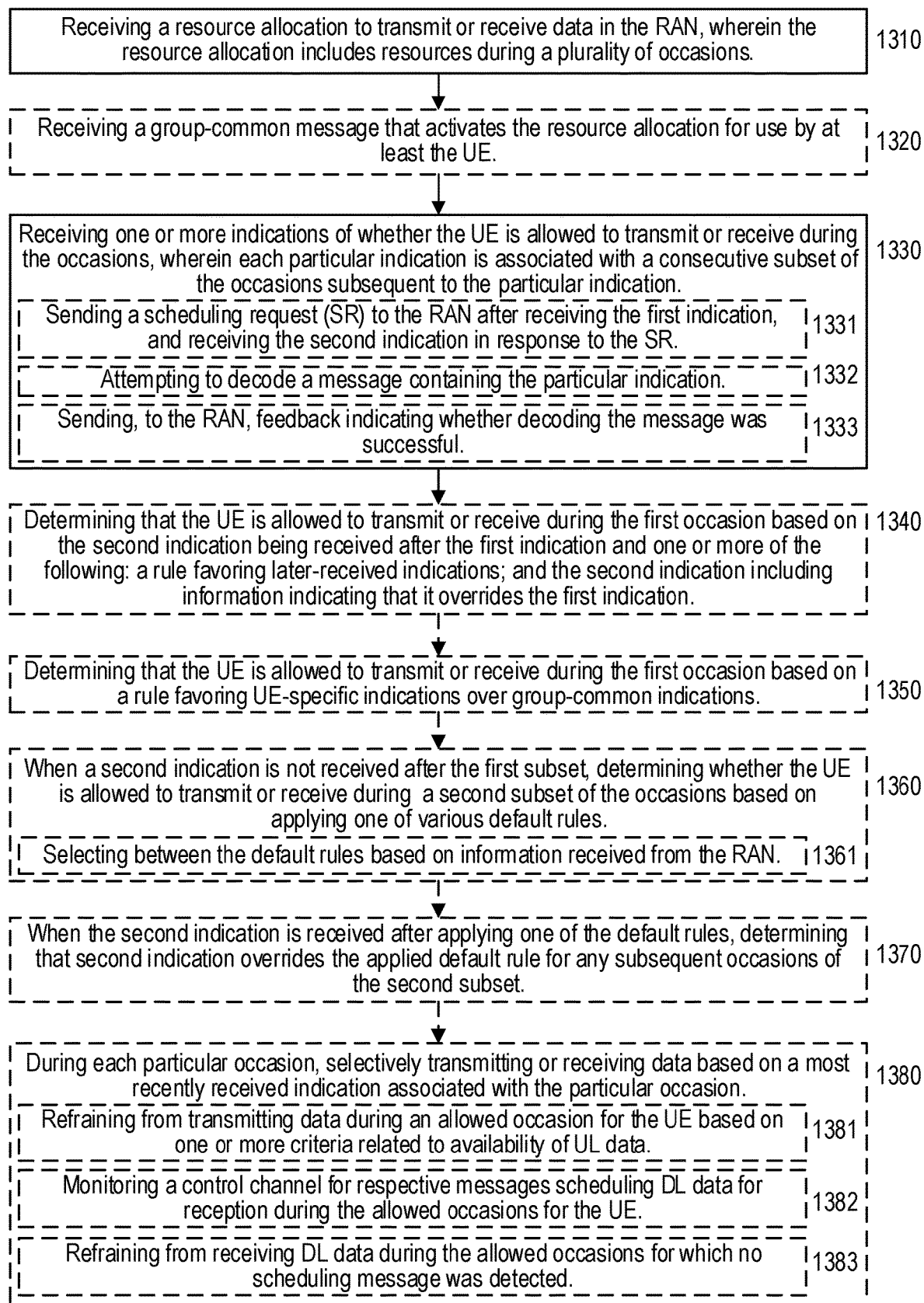
FIG. 13 shows a flow diagram of an exemplary method for a UE (e.g., wireless device), according to various exemplary embodiments of the present disclosure.
Figure 14:
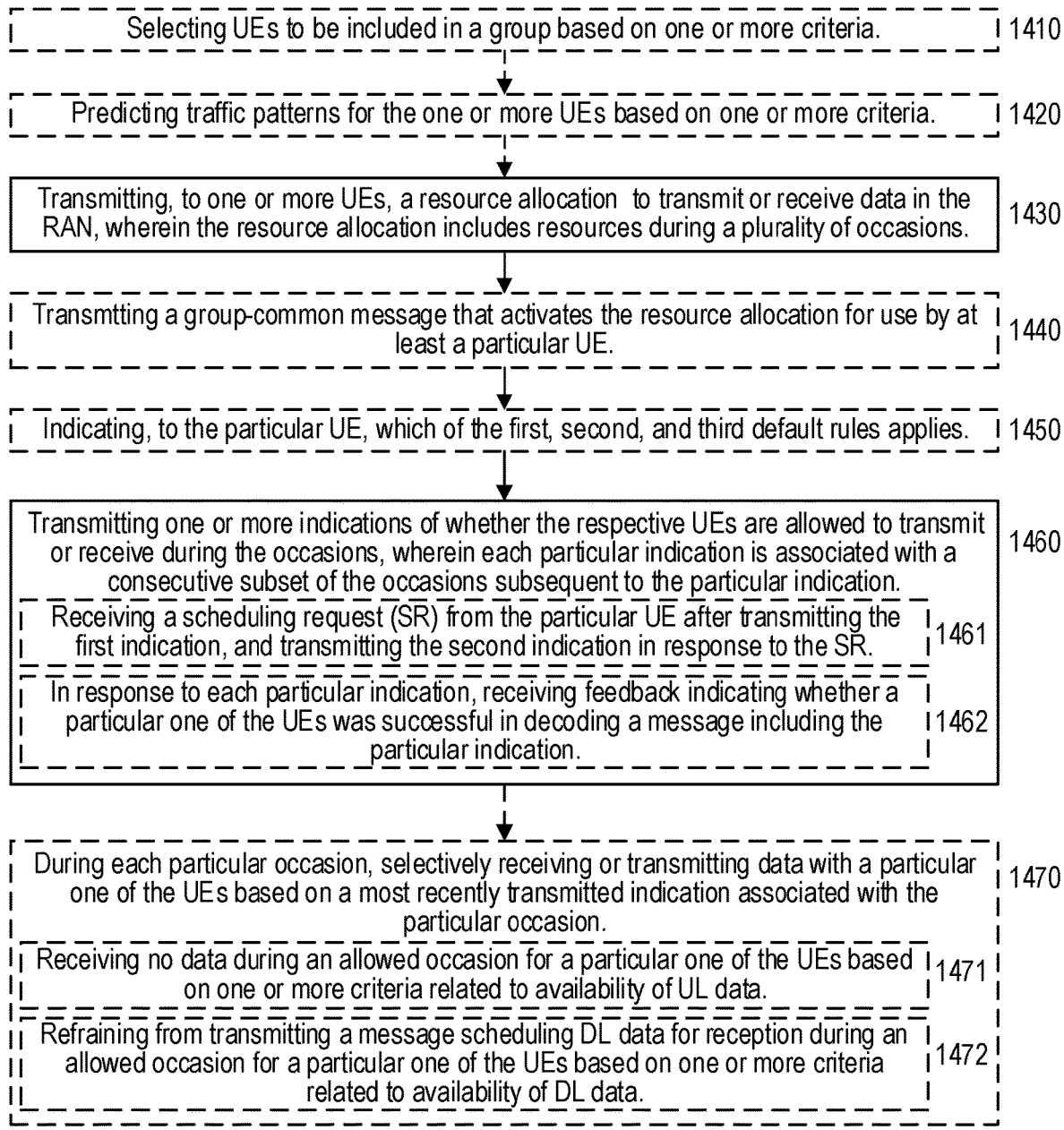
FIG. 14 shows a flow diagram of an exemplary method for a RAN node (e.g., base station, eNB, gNB, ng-eNB, etc.), according to various exemplary embodiments of the present disclosure.

Various features of the embodiments described above correspond to various operations illustrated in FIGS. 13-14, which show exemplary methods (e.g., procedures) for a UE and a RAN node, respectively. In other words, various features of the operations described below correspond to various embodiments described above. Furthermore, the exemplary methods shown in FIGS. 13-14 can be used cooperatively to provide various benefits, advantages, and/ or solutions to problems described herein. Although FIGS. 13-14 show specific blocks in particular orders, the operations of the exemplary methods can be performed in different orders than shown and can be combined and/or divided into blocks having different functionality than shown. Optional blocks or operations are indicated by dashed lines.

In particular, FIG. 13 shows an exemplary method (e.g., procedure) for a user equipment (UE) operating in a RAN, according to various exemplary embodiments of the present disclosure. The exemplary method can be performed by a UE (e.g., wireless device, IoT device, etc.) configured according to other figures described herein.

The exemplary method can include the operations of block 1310, where the UE can receive a resource allocation to transmit or receive data in the RAN. The resource allocation can include resources during a plurality of occasions, which can but are not required to be periodic. The exemplary method can also include the operations of block 1330, where the UE can subsequently receive one or more indications of whether the UE is allowed to transmit or receive during the occasions. Each particular indication is associated with a consecutive subset of the occasions subsequent to (e.g., immediately following) the particular indication.

For example, the UE can receive the resource allocation and the one or more indications from a RAN node (e.g., gNB, ng-eNB, etc.) that provides a cell serving the UE. In some embodiments, the resource allocation can be received as an RRC message and the indications can be received in respective DCI via a PDCCH. In some embodiments, the resource allocation can be a dedicated resource allocation for the UE. In other embodiments, the resource allocation can be a group resource allocation for a group of UEs, including the UE.

In some embodiments, receiving the one or more indications in block 1330 can include the operations of sub-block 1332-1333 for each particular indication. In sub-block 1332, the UE can attempt to decode a message containing the particular indication. In sub-block 1333, the UE can send, to the RAN, feedback indicating whether decoding the message was successful. In various embodiments, the feedback can be ACK-only, NACK-only, or both ACK-NACK, as discussed in more detail above.

In some embodiments, the one or more indications are associated with respective one or more subsets of a same number of the occasions. In other words, each subset includes the same number of occasions. In some embodiments, the one or more indications do not include information describing the resources allocated during the respective one or more associated subsets of the occasions. In this manner, the indications can be "occasion-centric" instead of "resource-centric", which facilitates smaller indicator size than conventional cancellation/pre-emption DCIs.

In some embodiments, each particular indication includes a bitmap of a plurality of bits that indicate whether the UE is allowed to transmit or receive in a corresponding plurality of the occasions of the associated subset. The bitmap DCI discussed above is an example of this type of indication.

In other embodiments, each particular indication can include one or more UE identifiers, and each UE identifier can correspond to one or more occasions of the particular subset associated with the particular indication. Additionally, each UE identifier indicates that, in the corresponding occasions of the particular subset, the identified UE is allowed to transmit or receive but other UEs are not allowed to transmit or receive. For four occasions and UEs 1-3, an exemplary indication of allowance according to these embodiments is {UE1, UE2, UE3, UE1}.

In some embodiments, the one or more indications include a first indication associated with a first subset of the occasions (e.g., a first bitmap DCI).

In some of these embodiments, the one or more indications can include a second indication associated with a second subset of the occasions (e.g., a second bitmap DCI). A first occasion is included in the first subset and the second subset. In other words, the first and second subsets overlap and/or coincide by at least the first occasion. In such embodiments, the first indication indicates that the UE is not allowed to transmit or receive during the first occasion, and the second indication indicates that the UE is allowed to transmit or receive during the first occasion.

In some of these embodiments, receiving the one or more indications (e.g., in block 1330) can include the operations of block 1331, where the UE can send a scheduling request (SR) to the RAN after receiving the first indication and receive the second indication in response to the SR, which indicates that the UE has data to transmit. In other words, the second indication that the UE is allowed to transmit in the first occasion is based on the SR indicating that the UE has data to transmit.

In other of these embodiments, the exemplary method can also include the operations of block 1340, where the UE can determine that it is allowed to transmit or receive during the first occasion based on the second indication being received after the first indication and one or more of the following: a rule prioritizing later-received indications; and the second indication including information indicating that it overrides the first indication. In this manner, the second indication can override, cancel, and/or pre-empt the earlier first indication, such as illustrated in FIGS. 10-12 and discussed above.

In other of these embodiments, the first indication can be a group-common indication for a group of UEs including the UE, and the second indication can be a UE-specific indication. In such embodiments, the exemplary method can also include the operations of block 1350, where the UE can determine that it is allowed to transmit or receive during the first occasion based on a rule prioritizing UE-specific indications over group-common indications. In some of these embodiments, the second subset, (i.e., associated with the group-common indication) includes a second occasion after the occasions of the first subset that is associated with the UE-specific indication. In such case, the UE may determine whether it is allowed to transmit or receive in the second occasion based on the group-common indication.

In some embodiments that include the first indication associated with the first subset, the exemplary method can also include the operations of block 1360, where when a second indication is not received after the first subset, the UE can determine whether it is allowed to transmit or receive during a second subset of the occasions that immediately follows the first subset based on applying one of the following default rules:
 a first default rule that associates the first indication with the second subset;
 a second default rule that the UE is not allowed to transmit or receive after the subset of occasions associated with the most recently received indication; and
 a third default rule that the UE is allowed to transmit or receive after the subset of occasions associated with the most recently received indication.

In some of these embodiments, the determining operations of block 1360 can include the operations of sub-block 1361, where the UE can select between the first, second, and third default rules based on one of the following:
 information included with the first indication (e.g., in block 1330);
 information included with the resource allocation (e.g., in block 1310), or
 an RRC message received from the RAN before the first indication.

In some of these embodiments, the exemplary method can also include the operations of block 1370, where when the second indication is received after applying one of the default rules, the UE can determine that second indication overrides the applied default rule for any subsequent (e.g., remaining) occasions of the second subset.

In some embodiments, each particular indication can be received (e.g., in block 1330) in a group-common message that includes respective indications for UEs of a group that includes the UE. The respective indications can be associated with a same consecutive subset of occasions. For example, the group-common message can include bitmap DCIs for each UE of a group, with each bitmap DCI indicating allowance for the same occasions. In some of these embodiments, the respective indications associated with a particular subset provide an orthogonal allocation of the resources among the UEs of the group during the occasions of the particular subset.

In some embodiments, the resource allocation can include a plurality of resource allocations associated with a respective plurality of identifiers. Each particular indication can include an identifier of the resource allocation to which the particular indication applies.

In some embodiments, the exemplary method can also include the operations of block 1380, where during each particular occasion, the UE can selectively transmit or receive data based on a most recently received indication associated with the particular occasion. In some of these embodiments, the exemplary method can also include the operations of block 1320, where the UE can receive a group-common message (e.g., activation DCI) that activates the resource allocation for use by at least the UE. In such embodiments, selectively transmitting or receiving (e.g., in block 1380) is further based on the activation of the resource allocation. In other words, the UE does not transmit or receive during an occasion unless the resource allocation is activated and the occasion is allowed for the UE. Although block 1320 is shown before block 1330 in FIG. 13, the group-common message can be received at any time, with the UE selectively transmitting or receiving based on a most recent group-common message (or a default activation/deactivation state, if a group-common message has not been received).

In some of these embodiments, the resource allocation can be for transmitting uplink (UL) data to the RAN. In such embodiments, selectively transmitting or receiving data in block 1380 can include the operations of sub-block 1381, where the UE can refrain from transmitting UL data during an allowed occasion for the UE based on one or more of the following:
 no UL data available;
 no UL data available for one or more particular logical channels;
 available UL data having an insufficient priority level; and
 available UL data not requiring low latency.

In other of these embodiments, the resource allocation can be for receiving downlink (DL) data from the RAN. In such embodiments, selectively transmitting or receiving data in block 1380 can include the operations of sub-blocks 1382-1383. In sub-block 1382, the UE can monitor a control channel for respective messages scheduling DL data for reception during the allowed occasions for the UE. In sub-block 1383, the UE can refrain from receiving DL data during the allowed occasions for which no scheduling message was detected.

In addition, FIG. 14 shows an exemplary method (e.g., procedure) for allocating resources of a RAN, according to various exemplary embodiments of the present disclosure. The exemplary method can be performed by a network node (e.g., base station, eNB, gNB, ng-eNB, etc., or component thereof) in the RAN (e.g., E-UTRAN, NG-RAN), such as network nodes configured according to other figures described herein.

The exemplary method can include the operations of block 1430, where the RAN node can transmit, to one or more UEs, a resource allocation to transmit or receive data in the RAN. The resource allocation can include resources during a plurality of occasions, which can but are not required to be periodic. The exemplary method can include the operations of block 1460, where the RAN node can subsequently transmit one or more indications of whether the respective UEs are allowed to transmit or receive during the occasions. Each particular indication is associated with a consecutive subset of the occasions subsequent to (e.g., immediately following) the particular indication:

For example, the RAN node can provide a cell serving the UE. In some embodiments, the resource allocation can be transmitted as an RRC message and the indications can be transmitted in respective DCI via a PDCCH.

In some embodiments, transmitting the one or more indications in block 1460 can include the operations of sub-block 1462, where in response to each particular indication, the RAN node can receive feedback indicating whether a particular one of the UEs was successful in decoding a message including the particular indication. In various embodiments, the feedback can be ACK-only, NACK-only, or both ACK-NACK, as discussed in more detail above.

In some embodiments, the resource allocation can be a dedicated resource allocation for the UE. In other embodiments, the resource allocation can be a group resource allocation for a group of UEs, including the UE. In some of these embodiments, the exemplary method can also include the operations of block 1410, where the network node can select the UEs included in the group based on one or more of the following criteria:

association with a common application or use case;
within a common coverage area of the RAN node (e.g., cell, cell sector, beam);
similar, correlated, or complementary traffic patterns; and
similar or complementary requirements of latency, reliability, and/or quality of service.

In some embodiments, the one or more indications are associated with respective one or more subsets of a same number of the occasions. In other words, each subset includes the same number of occasions. In some embodiments, the one or more indications do not include information describing the resources allocated during the respective one or more associated subsets of the occasions. In this manner, the indications can be "occasion-centric" instead of "resource-centric", which facilitates smaller indicator size than conventional cancellation/pre-emption DCIs.

In some embodiments, each particular indication includes a bitmap of a plurality of bits that indicate whether a particular one of the UEs is allowed to transmit or receive in a corresponding plurality of the occasions of the associated subset. The bitmap DCI discussed above is an example of this type of indication.

In other embodiments, each particular indication can include one or more UE identifiers, and each UE identifier can correspond to one or more occasions of the particular subset associated with the particular indication. Additionally, each UE identifier indicates that, in the corresponding occasions of the particular subset, the identified UE is allowed to transmit or receive but other UEs are not allowed to transmit or receive. For four occasions and UEs 1-3, an exemplary indication of allowance according to these embodiments is {UE1, UE2, UE3, UE1}.

In some embodiments, the one or more indications include a first indication associated with a first subset of the occasions (e.g., a first bitmap DCI).

In some of these embodiments, the one or more indications can include a second indication associated with a second subset of the occasions (e.g., a second bitmap DCI). A first occasion is included in the first subset and the second subset. In other words, the first and second subsets overlap and/or coincide by at least the first occasion. In such embodiments, the first indication indicates that a particular UE is not allowed to transmit or receive during the first occasion, and the second indication indicates that the particular UE is allowed to transmit or receive during the first occasion.

In some of these embodiments, transmitting the one or more indications (e.g., in block 1460) can include the operations of block 1461, where the RAN node can receive a scheduling request (SR) from the particular UE after transmitting the first indication, and transmit the second indication in response to the SR, which indicates that the UE has data to transmit. In other words, the second indication that the UE is allowed to transmit in the first occasion is based on the SR indicating that the UE has data to transmit.

In other of these embodiments, the second indication can indicate that the particular UE is allowed to transmit or receive during the first occasion based on being transmitted after the first indication and one or more of the following: a rule prioritizing later-received indications; and the second indication including information indicating that it overrides the first indication.

In other of these embodiments, the first indication can be a group-common indication for a group of UEs including the particular UE, and the second indication can be a UE-specific indication. In such embodiments, the second indication can indicate that the particular UE is allowed to transmit or receive during the first occasion based on a rule prioritizing UE-specific indications over group-common indications. In some of these embodiments, the second subset, (i.e., associated with the group-common indication) can include a second occasion after the occasions of the first subset that is associated with the UE-specific indication. In such case, the group-common indication indicates whether the particular UE is allowed to transmit or receive in the second occasion.

In other of these embodiments, one of the following default rules applies to a second subset of the occasions that immediately follows the first subset, when a second indication is not transmitted after the first subset:

a first default rule that associates the first indication with the second subset;
a second default rule that UEs are not allowed to transmit or receive after the subset of occasions associated with the most recently received indication; and
a third default rule that UEs are allowed to transmit or receive after the subset of occasions associated with the most recently received indication.

In some of these embodiments, the exemplary method can also include the operations of block 1450, where the RAN node can indicate, to the particular UE, which of the first, second, and third default rules applies based on one of the following:

information included with the first indication (e.g., in block 1460);
information included with the resource allocation (e.g., in block 1430), or
an RRC message transmitted before the first indication.

In some of these embodiments, when the second indication is transmitted after the first subset, the second indication overrides an applied default rule for any subsequent (e.g., remaining) occasions of the second subset.

In some embodiments, each particular indication can be transmitted (e.g., in block 1460) in a group-common message that includes respective indications for UEs of a group that includes the one or more UEs. The respective indications can be associated with a same consecutive subset of occasions. For example, the group-common message can include bitmap DCIs for each UE of a group, with each bitmap DCI indicating UE-specific allowance for the same occasions. In some of these embodiments, the respective indications associated with a particular subset can provide an orthogonal allocation of the resources among the UEs of the group during the occasions of the particular subset.

In some embodiments, the resource allocation can include a plurality of resource allocations associated with a respective plurality of identifiers. Each particular indication can include an identifier of the resource allocation to which the particular indication applies.

In some embodiments, the exemplary method can also include the operations of block 1470, where during each particular occasion, the RAN node can selectively receive or transmit data with a particular one of the UEs based on a most recently transmitted indication associated with the particular occasion. In some of these embodiments, the exemplary method can also include the operations of block 1440, where the RAN node can transmit a group-common message (e.g., activation DCI) that activates the resource allocation for use by at least the particular UE. In such embodiments, selectively receiving or transmitting (e.g., in block 1470) is further based on the activation of the resource allocation. In other words, the RAN node does not receive or transmit with a particular UE during an occasion unless the resource allocation is activated and the occasion is allowed for the particular UE. Although block 1440 is shown before block 1460 in FIG. 14, the group-common message can be transmitted at any time, with the RAN node selectively receiving or transmitting based on a most recent group-common message (or a default activation/deactivation state, if a group-common message has not been transmitted).

In some of these embodiments, the resource allocation can be for transmitting uplink (UL) data to the RAN. In such embodiments, selectively receiving or transmitting data in block 1470 can include the operations of sub-block 1471, where the RAN node can receive no data during an allowed occasion for a particular one of the UEs based on one or more of the following conditions at the particular UE:
  no UL data available;
  no UL data available for one or more particular logical channels;
  available UL data having an insufficient priority level; and
  available UL data not requiring low latency.

In other of these embodiments, the resource allocation can be for receiving downlink (DL) data from the RAN. In such embodiments, selectively receiving or transmitting data in block 1470 can include the operations of sub-block 1472, where the RAN node can refrain from transmitting a message scheduling DL data during an allowed occasion for a particular one of the UEs based on one or more of the following conditions related to the particular UE:
  no DL data available;
  no DL data available for one or more particular logical channels;
  available DL data has an insufficient priority level; and
  available DL data does not require low latency.

In some embodiments, the exemplary method can also include the operations of block 1420, where the RAN node can predict traffic patterns for the one or more UEs based on one or more of the following:
  scheduling requests (SR) and buffer status reports (BSR) previously received from the one or more UEs,
  previous downlink (DL) scheduling for the one or more UEs,
  information associated with an application used by the one or more UEs, and
  information from another node or function in the RAN or in a core network (e.g., EPC, 5GC) associated with the RAN; and
In such embodiments, the resource allocation for the one or more UEs (e.g., in block 1430) can be based on the predicted traffic patterns.

In some of these embodiments, the indications include a first set of indications (e.g., transmitted to the respective UEs in block 1460) that are based on the respective predicted UE traffic patterns, and a second set of indications (e.g., transmitted to the respective UEs in block 1460) that are based on respective actual UE traffic patterns during occasions associated with the first set of indications. As an example, the bitmap DCIs shown in FIG. 10 can be based on predicted UE traffic patterns and the bitmap DCIs shown in FIGS. 11-12 can be based on actual UE traffic patterns (e.g., as indicated by the received SRs).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 15:
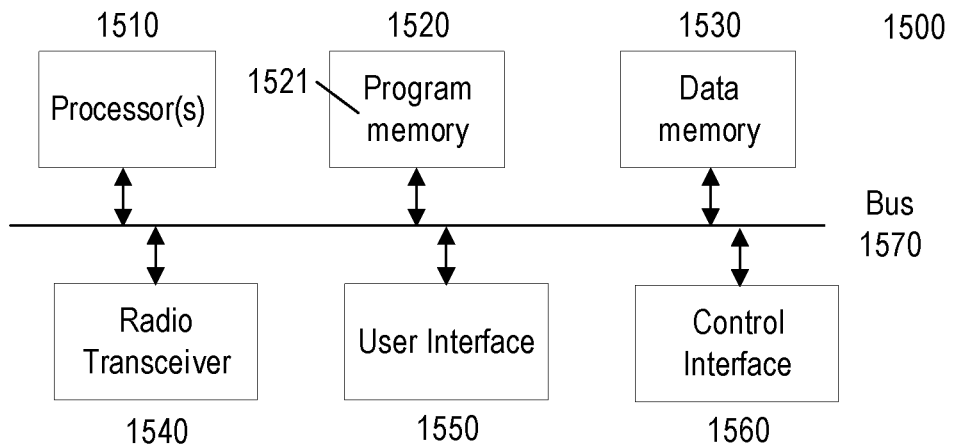
FIG. 15 shows a block diagram of an exemplary UE (e.g., wireless device), according to various exemplary embodiments of the present disclosure.

FIG. 15 shows a block diagram of an exemplary wireless device or user equipment (UE) 1500 (hereinafter referred to as "UE 1500") according to various embodiments of the present disclosure, including those described above with reference to other figures. For example, UE 1500 can be configured by execution of instructions, stored on a computer-readable medium, to perform operations corresponding to one or more of the exemplary methods described herein.

UE 1500 can include a processor 1510 (also referred to as "processing circuitry") that can be operably connected to a program memory 1520 and/or a data memory 1530 via a bus 1570 that can comprise parallel address and data buses, serial ports, or other methods and/or structures known to those of ordinary skill in the art. Program memory 1520 can store software code, programs, and/or instructions (collectively shown as computer program product 1521 in FIG. 15) that, when executed by processor 1510, can configure and/or facilitate UE 1500 to perform various operations, including operations corresponding to various exemplary methods described herein. As part of or in addition to such operations, execution of such instructions can configure and/or facilitate UE 1500 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1540, user interface 1550, and/or control interface 1560.

As another example, processor 1510 can execute program code stored in program memory 1520 that corresponds to MAC, RLC, PDCP, SDAP, RRC, and NAS layer protocols standardized by 3GPP (e.g., for NR and/or LTE). As a further example, processor 1510 can execute program code stored in program memory 1520 that, together with radio transceiver 1540, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1510 can execute program code stored in program memory 1520 that, together with radio transceiver 1540, implements device-to-device (D2D) communications with other compatible devices and/or UEs.

Program memory 1520 can also include software code executed by processor 1510 to control the functions of UE 1500, including configuring and controlling various components such as radio transceiver 1540, user interface 1550, and/or control interface 1560. Program memory 1520 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1520 can comprise an external storage arrangement (not shown) remote from UE 1500, from which the instructions can be downloaded into program memory 1520 located within or removably coupled to UE 1500, so as to enable execution of such instructions.

Data memory 1530 can include memory area for processor 1510 to store variables used in protocols, configuration, control, and other functions of UE 1500, including operations corresponding to, or comprising, any of the exemplary methods described herein. Moreover, program memory 1520 and/or data memory 1530 can include non-volatile memory (e.g., flash memory), volatile memory (e.g., static or dynamic RAM), or a combination thereof. Furthermore, data memory 1530 can comprise a memory slot by which removable memory cards in one or more formats (e.g., SD Card, Memory Stick, Compact Flash, etc.) can be inserted and removed.

Persons of ordinary skill will recognize that processor 1510 can include multiple individual processors (including, e.g., multi-core processors), each of which implements a portion of the functionality described above. In such cases, multiple individual processors can be commonly connected to program memory 1520 and data memory 1530 or individually connected to multiple individual program memories and or data memories. More generally, persons of ordinary skill in the art will recognize that various protocols and other functions of UE 1500 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1540 can include radio-frequency transmitter and/or receiver functionality that facilitates the UE 1500 to communicate with other equipment supporting like wireless communication standards and/or protocols. In some exemplary embodiments, the radio transceiver 1540 includes one or more transmitters and one or more receivers that enable UE 1500 to communicate according to various protocols and/or methods proposed for standardization by 3GPP and/or other standards bodies. For example, such functionality can operate cooperatively with processor 1510 to implement a PHY layer based on OFDM, OFDMA, and/or SC-FDMA technologies, such as described herein with respect to other figures.

In some exemplary embodiments, radio transceiver 1540 includes one or more transmitters and one or more receivers that can facilitate the UE 1500 to communicate with various LTE, LTE-Advanced (LTE-A), and/or NR networks according to standards promulgated by 3GPP. In some exemplary embodiments of the present disclosure, the radio transceiver 1540 includes circuitry, firmware, etc. necessary for the UE 1500 to communicate with various NR, NR-U, LTE, LTE-A, LTE-LAA, UMTS, and/or GSM/EDGE networks, also according to 3GPP standards. In some embodiments, radio transceiver 1540 can include circuitry supporting D2D communications between UE 1500 and other compatible devices.

In some embodiments, radio transceiver 1540 includes circuitry, firmware, etc. necessary for the UE 1500 to communicate with various CDMA2000 networks, according to 3GPP2 standards. In some embodiments, the radio transceiver 1540 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1540 can include a transceiver that is capable of wired communication, such as by using IEEE 802.3 Ethernet technology. The functionality particular to each of these embodiments can be coupled with and/or controlled by other circuitry in the UE 1500, such as the processor 1510 executing program code stored in program memory 1520 in conjunction with, and/or supported by, data memory 1530.

User interface 1550 can take various forms depending on the particular embodiment of UE 1500, or can be absent from UE 1500 entirely. In some embodiments, user interface 1550 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1500 can comprise a tablet computing device including a larger touchscreen display. In such embodiments, one or more of the mechanical features of the user interface 1550 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1500 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1500 having a touch screen display are capable of receiving user inputs, such as inputs related to exemplary methods described herein or otherwise known to persons of ordinary skill.

In some embodiments, UE 1500 can include an orientation sensor, which can be used in various ways by features and functions of UE 1500. For example, the UE 1500 can use outputs of the orientation sensor to determine when a user has changed the physical orientation of the UE 1500's touch screen display. An indication signal from the orientation sensor can be available to any application program executing on the UE 1500, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1560 of the UE 1500 can take various forms depending on the particular exemplary embodiment of UE 1500 and of the particular interface requirements of other devices that the UE 1500 is intended to communicate with and/or control. For example, the control interface 1560 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1560 can comprise an IEEE 802.3 Ethernet interface such as described above. In some exemplary embodiments of the present disclosure, the control interface 1560 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1500 can comprise more functionality than is shown in FIG. 15 including, for example, a video and/or still-image camera, microphone, media player and/or recorder, etc. Moreover, radio transceiver 1540 can include circuitry necessary to communicate using additional radio-frequency communication standards including Bluetooth, GPS, and/or others. Moreover, the processor 1510 can execute software code stored in the program memory 1520 to control such additional functionality. For example, directional velocity and/or position estimates output from a GPS receiver can be available to any application program executing on the UE 1500, including any program code corresponding to and/or embodying any exemplary embodiments (e.g., of methods) described herein.

Figure 16:
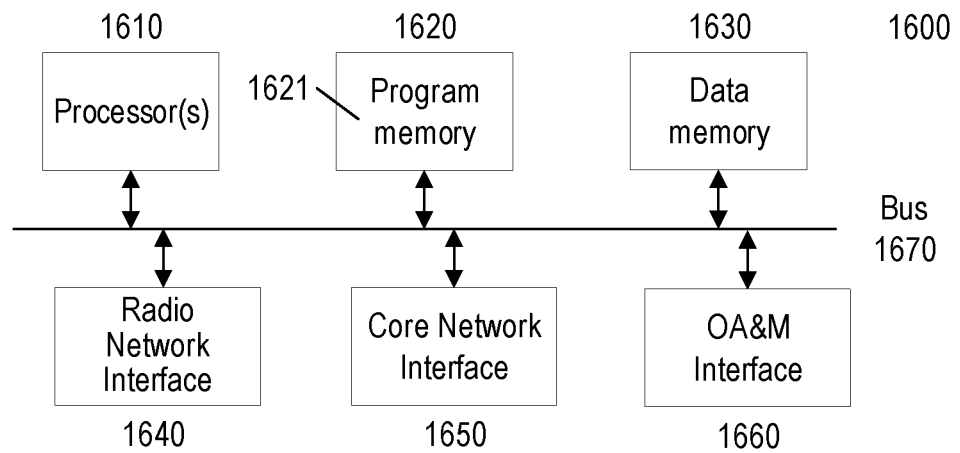
FIG. 16 shows a block diagram of an exemplary network node (e.g., base station, eNB, gNB, ng-eNB, etc.), according to various exemplary embodiments of the present disclosure.

FIG. 16 shows a block diagram of an exemplary network node 1600 according to various embodiments of the present disclosure, including those described above with reference to other figures. For example, exemplary network node 1600 can be configured by execution of instructions, stored on a computer-readable medium, to perform operations corresponding to one or more of the exemplary methods described herein. In some exemplary embodiments, network node 1600 can comprise a base station, eNB, gNB, or one or more components thereof. For example, network node 1600 can be configured as a central unit (CU) and one or more distributed units (DUs) according to NR gNB architectures specified by 3GPP. More generally, the functionally of network node 1600 can be distributed across various physical devices and/or functional units, modules, etc.

Network node 1600 can include processor 1610 (also referred to as "processing circuitry") that is operably connected to program memory 1620 and data memory 1630 via bus 1670, which can include parallel address and data buses, serial ports, or other methods and/or structures known to those of ordinary skill in the art.

Program memory 1620 can store software code, programs, and/or instructions (collectively shown as computer program product 1621 in FIG. 16) that, when executed by processor 1610, can configure and/or facilitate network node 1600 to perform various operations, including operations corresponding to various exemplary methods described herein. As part of and/or in addition to such operations, program memory 1620 can also include software code executed by processor 1610 that can configure and/or facilitate network node 1600 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1640 and/or core network interface 1650. By way of example, core network interface 1650 can comprise the S1 or NG interface and radio network interface 1640 can comprise the Uu interface, as standardized by 3GPP. Program memory 1620 can also comprise software code executed by processor 1610 to control the functions of network node 1600, including configuring and controlling various components such as radio network interface 1640 and core network interface 1650.

Data memory 1630 can comprise memory area for processor 1610 to store variables used in protocols, configuration, control, and other functions of network node 1600. As such, program memory 1620 and data memory 1630 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1610 can include multiple individual processors (not shown), each of which implements a portion of the functionality described above. In such case, multiple individual processors may be commonly connected to program memory 1620 and data memory 1630 or individually connected to multiple individual program memories and/or data memories. More generally, persons of ordinary skill will recognize that various protocols and other functions of network node 1600 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1640 can comprise transmitters, receivers, signal processors, ASICs, antennas, beamforming units, and other circuitry that enables network node 1600 to communicate with other equipment such as, in some embodiments, a plurality of compatible user equipment (UE). In some embodiments, interface 1640 can also enable network node 1600 to communicate with compatible satellites of a satellite communication network. In some exemplary embodiments, radio network interface 1640 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1640. According to further exemplary embodiments of the present disclosure, the radio network interface 1640 can comprise a PHY layer based on OFDM, OFDMA, and/or SC-FDMA technologies. In some embodiments, the functionality of such a PHY layer can be provided cooperatively by radio network interface 1640 and processor 1610 (including program code in memory 1620).

Core network interface 1650 can comprise transmitters, receivers, and other circuitry that enables network node 1600 to communicate with other equipment in a core network such as, in some embodiments, circuit-switched (CS) and/or packet-switched Core (PS) networks. In some embodiments, core network interface 1650 can comprise the S1 interface standardized by 3GPP. In some embodiments, core network interface 1650 can comprise the NG interface standardized by 3GPP. In some exemplary embodiments, core network interface 1650 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1650 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1600 can include hardware and/or software that configures and/or facilitates network node 1600 to communicate with other network nodes in a RAN, such as with other eNBs, gNBs, ng-eNBs, en-gNBs, IAB nodes, etc. Such hardware and/or software can be part of radio network interface 1640 and/or core network interface 1650, or it can be a separate functional unit (not shown). For example, such hardware and/or software can configure and/or facilitate network node 1600 to communicate with other RAN nodes via the X2 or Xn interfaces, as standardized by 3GPP.

OA&M interface 1660 can comprise transmitters, receivers, and other circuitry that enables network node 1600 to communicate with external networks, computers, databases, and the like for purposes of operations, administration, and maintenance of network node 1600 or other network equipment operably connected thereto. Lower layers of OA&M interface 1660 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1640, core network interface 1650, and OA&M interface 1660 may be multiplexed together on a single physical interface, such as the examples listed above.

Figure 17:
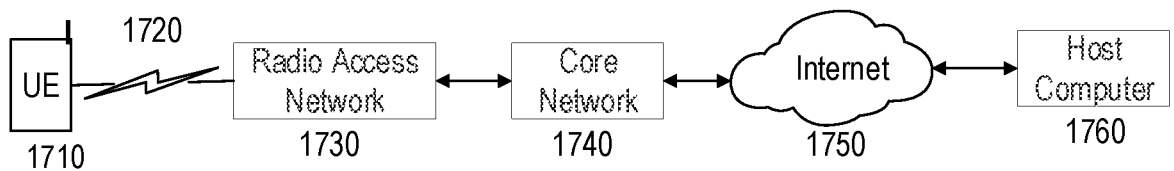
FIG. 17 shows a block diagram of an exemplary network configured to provide over-the-top (OTT) data services between a host computer and a UE, according to various exemplary embodiments of the present disclosure.

FIG. 17 is a block diagram of an exemplary communication network configured to provide over-the-top (OTT) data services between a host computer and a user equipment (UE), according to one or more exemplary embodiments of the present disclosure. UE 1710 can communicate with radio access network (RAN) 1730 over radio interface 1720, which can be based on protocols described above including, e.g., LTE, LTE-A, and 5G/NR. For example, UE 1710 can be configured and/or arranged as shown in other figures discussed above.

RAN 1730 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1730 can cooperatively operate using licensed and unlicensed spectrum. In some embodiments, RAN 1730 can include, or be capable of communication with, one or more satellites comprising a satellite access network.

RAN 1730 can further communicate with core network 1740 according to various protocols and interfaces described above. For example, one or more apparatus (e.g., base stations, eNBs, gNBs, ng-eNBs, etc.) comprising RAN 1730 can communicate to core network 1740 via core network interface 1750 described above. In some exemplary embodiments, RAN 1730 and core network 1740 can be configured and/or arranged as shown in other figures discussed above. For example, eNBs comprising an evolved UTRAN (E-UTRAN) 1730 can communicate with an evolved packet core (EPC) network 1740 via an S1 interface. As another example, gNBs and ng-eNBs comprising an NG-RAN 1730 can communicate with a 5GC network 1730 via an NG interface.

Core network 1740 can further communicate with an external packet data network, illustrated in FIG. 17 as Internet 1750, according to various protocols and interfaces known to persons of ordinary skill in the art. Many other devices and/or networks can also connect to and communicate via Internet 1750, such as exemplary host computer 1760. In some exemplary embodiments, host computer 1760 can communicate with UE 1710 using Internet 1750, core network 1740, and RAN 1730 as intermediaries. Host computer 1760 can be a server (e.g., an application server) under ownership and/or control of a service provider. Host computer 1760 can be operated by the OTT service provider or by another entity on the service provider's behalf.

For example, host computer 1760 can provide an over-the-top (OTT) packet data service to UE 1710 using facilities of core network 1740 and RAN 1730, which can be unaware of the routing of an outgoing/incoming communication to/from host computer 1760. Similarly, host computer 1760 can be unaware of routing of a transmission from the host computer to the UE, e.g., the routing of the transmission through RAN 1730. Various OTT services can be provided using the exemplary configuration shown in FIG. 17 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 17 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques to dynamically activate, deactivate, and/or modify a pre-configured resource allocation (e.g., CG/SPS) for a one or more UEs, such as a group of UEs. Such techniques can be more spectrally efficient than conventional CG/SPS, by allowing a group of UEs to share a single periodic grant or allocation. Since each UE's traffic pattern is irregular, the spectral resources needed to meet application latency requirements are less than if each UE was allocated independent periodic resources. Embodiments also require less signaling overhead compare to conventional dynamic resource allocation. These advantages facilitate improved PDCCH resource efficiency, thereby increasing the number of UEs that can be supported in a cell and/or avoiding overly-constrained PDCCH resources.

When used in NR UEs (e.g., UE 1710) and gNBs (e.g., gNBs comprising RAN 1730), these improvements can increase the use of OTT data services—including XR applications—by providing better QoE to OTT service providers and end users. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for a user equipment (UE) operating in a radio access network (RAN), the method comprising:
   receiving a resource allocation to transmit or receive data in the RAN, wherein the resource allocation indicates resources during a plurality of occasions; and
   subsequently receiving one or more indications of whether the UE is allowed to transmit or receive during the occasions, wherein:
      each particular indication is associated with a consecutive subset of the occasions subsequent to the particular indication:
      each particular indication includes one or more UE identifiers;
      each UE identifier corresponds to one or more occasions of the particular subset associated with the particular indication; and
      each UE identifier indicates that, in the corresponding occasions of the particular subset, the identified UE is allowed to transmit or receive but other UEs are not allowed to transmit or receive.

2. The method of claim 1, wherein one or more of the following applies:
   the one or more indications are associated with respective one or more subsets of a same number of the occasions; and
   the one or more indications do not include information describing the resources allocated during the respective one or more associated subsets of the occasions.

3. The method of claim 1, wherein the resource allocation is one of the following:
   a dedicated resource allocation for the UE; or
   a group resource allocation for a group of UEs, including the UE.

4. The method of claim 1, wherein:
   the one or more indications include a first indication associated with a first subset of the occasions and a second indication associated with a second subset of the occasions;
   a first occasion is included in the first subset and the second subset;
   the first indication indicates that the UE is not allowed to transmit or receive during the first occasion; and
   the second indication indicates that the UE is allowed to transmit or receive during the first occasion.

5. The method of claim 4, wherein:
   receiving one or more indications comprises sending a scheduling request (SR) to the RAN after receiving the first indication, and receiving the second indication in response to the SR; and
   the scheduling request indicates that the UE has data to transmit.

6. The method of claim 4, further comprising determining that the UE is allowed to transmit or receive during the first occasion based on the second indication being received after the first indication and on one or more of the following:
   a rule prioritizing later-received indications; and the second indication including information indicating that it overrides the first indication.

7. The method of claim 4, wherein:
the first indication is a group-common indication for a group of UEs, including the UE;
the second indication is a UE-specific indication; and
the method further comprises determining that the UE is allowed to transmit or receive during the first occasion based on a rule prioritizing UE-specific indications over group-common indications.

8. The method of claim 1, wherein:
the one or more indications include a first indication associated with a first subset of the occasions; and
the method further comprises, when a second indication is not received after the first subset, determining whether the UE is allowed to transmit or receive during a second subset of the occasions that immediately follows the first subset based on applying one of the following default rules:
a first default rule that associates the first indication with the second subset;
a second default rule that the UE is not allowed to transmit or receive after the subset of occasions associated with the most recently received indication; and
a third default rule that the UE is allowed to transmit or receive after the subset of occasions associated with the most recently received indication.

9. The method of claim 1, further comprising, during each particular occasion, selectively transmitting or receiving data based on a most recently received indication associated with the particular occasion.

10. A method for a radio access network (RAN) node to allocate resources of the RAN, the method comprising:
transmitting, to one or more user equipment (UEs), a resource allocation to transmit or receive data in the RAN, wherein the resource allocation indicates resources during a plurality of occasions; and
subsequently transmitting one or more indications of whether the respective UEs are allowed to transmit or receive during the occasions, wherein:
each particular indication is associated with a consecutive subset of the occasions subsequent to the particular indication;
each particular indication includes one or more UE identifiers;
each UE identifier corresponds to one or more occasions of the particular subset associated with the particular indication; and
each UE identifier indicates that, in the corresponding occasions of the particular subset, the identified UE is allowed to transmit or receive but other UEs are not allowed to transmit or receive.

11. The method of claim 10, wherein one or more of the following applies:
the one or more indications are associated with respective one or more subsets of a same number of the occasions; and
the one or more indications do not include information describing the resources allocated during the respective one or more associated subsets of the occasions.

12. The method of claim 10, wherein the resource allocation is one of the following:
dedicated resource allocations for the respective UEs; or
a group resource allocation for a group of UEs, including the one or more UEs.

13. A user equipment (UE) configured for operation in a radio access network (RAN), the UE comprising:
radio transceiver circuitry configured to communicate with the RAN; and
processing circuitry operably coupled to the radio transceiver circuitry, whereby the processing circuitry and the radio transceiver circuitry are configured to:
receive a resource allocation to transmit or receive data in the RAN, wherein the resource allocation includes resources during a plurality of occasions; and
subsequently receive one or more indications of whether the UE is allowed to transmit or receive during the occasions, wherein:
each particular indication is associated with a consecutive subset of the occasions subsequent to the particular indication;
each particular indication includes one or more UE identifiers;
each UE identifier corresponds to one or more occasions of the particular subset associated with the particular indication; and
each UE identifier indicates that, in the corresponding occasions of the particular subset, the identified UE is allowed to transmit or receive but other UEs are not allowed to transmit or receive.

14. The UE of claim 13, wherein:
the one or more indications include a first indication associated with a first subset of the occasions and a second indication associated with a second subset of the occasions;
a first occasion is included in the first subset and the second subset;
the first indication indicates that the UE is not allowed to transmit or receive during the first occasion; and
the second indication indicates that the UE is allowed to transmit or receive during the first occasion.

15. A radio access network (RAN) node configured to allocate resources of the RAN, the RAN node comprising:
radio network interface circuitry configured to communicate with one or more user equipment (UE); and
processing circuitry operably coupled to the radio network interface circuitry, whereby the processing circuitry and the radio network interface circuitry are configured to:
transmit, to the one or more UEs, a resource allocation to transmit or receive data in the RAN, wherein the resource allocation indicates resources during a plurality of occasions; and
subsequently transmit one or more indications of whether the respective UEs are allowed to transmit or receive during the occasions, wherein:
each particular indication is associated with a consecutive subset of the occasions subsequent to the particular indication;
each particular indication includes one or more UE identifiers;
each UE identifier corresponds to one or more occasions of the particular subset associated with the particular indication; and
each UE identifier indicates that, in the corresponding occasions of the particular subset, the identified UE is allowed to transmit or receive but other UEs are not allowed to transmit or receive.

16. The RAN node of claim 15, wherein:
the one or more indications include a first indication associated with a first subset of the occasions and a second indication associated with a second subset of the occasions;
a first occasion is included in the first subset and the second subset;
the first indication indicates that the UE is not allowed to transmit or receive during the first occasion; and
the second indication indicates that the UE is allowed to transmit or receive during the first occasion.

\* \* \* \* \*